(12) United States Patent
Itoyama et al.

(10) Patent No.: US 6,301,529 B1
(45) Date of Patent: Oct. 9, 2001

(54) DRIVING APPARATUS AND METHOD FOR HYBRID VEHICLE

(75) Inventors: Hiroyuki Itoyama, Yokohama; Manabu Miura; Takashi Shirakawa, both of Kanagawa, all of (JP)

(73) Assignee: Nissan Motor Co., LTD, Yokohama (JP)

( * ) Notice: Subject to any disclaimer, the term of this patent is extended or adjusted under 35 U.S.C. 154(b) by 0 days.

(21) Appl. No.: 09/620,972

(22) Filed: Jul. 20, 2000

(30) Foreign Application Priority Data

Jul. 21, 1999 (JP) .................................................. 11-205951

(51) Int. Cl.[7] .............................. B60L 11/14; B60K 41/00; F02D 29/02; F02D 29/06
(52) U.S. Cl. .............................. 701/22; 477/15; 180/65.2; 60/274
(58) Field of Search .................................. 701/22, 69, 90, 701/109, 103; 477/15; 180/65.2, 65.4, 65.1; 60/274, 284, 285

(56) References Cited

U.S. PATENT DOCUMENTS

| | | | |
|---|---|---|---|
| 4,688,449 | * 8/1987 | Harada et al. | 74/740 |
| 4,708,032 | * 11/1987 | Harada et al. | 74/866 |
| 4,724,725 | * 2/1988 | Harada et al. | 74/866 |
| 5,327,992 | 7/1994 | Boll . | |
| 5,923,093 | * 7/1999 | Tabata et al. | 290/40 C |
| 6,077,186 | * 6/2000 | Kojima et al. | 477/3 |
| 6,086,139 | * 7/2000 | Deguchi et al. | 477/5 |
| 6,090,007 | * 7/2000 | Nakajima et al. | 477/46 |
| 6,118,237 | * 9/2000 | Kikuchi et al. | 318/139 |
| 6,190,283 | * 2/2001 | Uchida | 477/5 |
| 6,196,344 | * 3/2001 | Tamor | 180/65.4 |
| 6,201,312 | * 3/2001 | Shioiri et al. | 290/40 |
| 6,208,034 | * 3/2001 | Yamaguchi | 290/40 C |

FOREIGN PATENT DOCUMENTS

| | | |
|---|---|---|
| 6-48222 | 2/1994 | (JP) . |
| 9-98516 | 4/1997 | (JP) . |
| 9-238403 | 9/1997 | (JP) . |

* cited by examiner

*Primary Examiner*—William A. Cuchlinski, Jr.
*Assistant Examiner*—Olga Hernandez
(74) *Attorney, Agent, or Firm*—Foley & Lardner

(57) ABSTRACT

In driving apparatus and method for a hybrid vehicle, a controller is provided and programmed: to calculate a target driving force [tFd], the target driving force representing a target value of a vehicular driving force; to calculate a basic target engine speed [tNinb] on the basis of tFd, the basic target engine speed representing a basic target value of the engine speed; to calculate a power generation request quantity [tWg], the power generation request quantity representing a power to be generated by the motor/generator; to calculate a basic target engine torque [tTeg] on the basis of tFd, tWg, and tNinb, the basic target engine torque representing an engine torque to be developed when an output required for a vehicular drive and for a power drive of the motor/generator is developed at tNinb; to calculate a limit torque [tTlim] during an occurrence of a power generation request on the basis of tNinb, this limit torque representing a limit torque of the engine when the engine is driven at the tNinb, satisfying a demand for an exhaust performance of the engine; to set a target engine speed [tNin] to either tNinb or a value different from tNinb according to a result of comparison between tTeg and tTlim; and to control the engine on the basis of tNin.

14 Claims, 25 Drawing Sheets

DRIVING APPARATUS AND METHOD FOR HYBRID VEHICLE

BACKGROUND OF THE INVENTION

1. Field of the Invention

The present invention relates to driving apparatus and method for a hybrid vehicle in which a motor/generator is equipped to regenerate an energy and to assist an engine output.

2. Description of the Related Art

A Japanese Patent Application First Publication No. Heisei 9-98516 published on Apr. 8, 1997 exemplifies a first previously proposed driving apparatus for the hybrid vehicle.

In the first previously proposed driving apparatus, a driving point of an engine in the hybrid vehicle is selected from either one of the driving points at which a fuel consumption is best (viz., approximately minimized) or at which an exhaust gas quantity is approximately minimized and a transmission and the motor/generator are operated to achieve this requirement.

On the other hand, a Japanese Patent Application First Publication No. Heisei 9-238403 published on Sep. 9, 1997 exemplifies a second previously proposed driving apparatus for the hybrid vehicle in which the motor/generator is equipped and is associated with a Diesel engine.

In the second previously proposed driving apparatus, the motor/generator is controlled to generate a power by means of an extra torque of the engine during a normal (or a steady-state) vehicular run so as to regenerate an energy and is controlled to assist an engine output during a vehicular acceleration.

SUMMARY OF THE INVENTION

However, in the case of the first previously proposed driving apparatus, an engine revolution is needed to be raised even under a low engine load while a power generation request occurs since, in general, as an engine load becomes lower, a quantity of exhaust gas becomes less.

On the other hand, since, in the second previously proposed driving apparatus, the power generation by the motor/generator is allowed to be carried out over a whole range of the extra torque developed by the engine, an exhaust performance of the engine becomes worsened as a larger quantity of power generation is requested.

It is, therefore, an object of the present invention to provide driving apparatus and method for the hybrid vehicle in which the engine is limited into a predetermined operational range when the power generation request occurs, the exhaust performance is improved by securing the power generation request quantity within the predetermined operational range and the worsening of the fuel consumption is suppressed as low as possible and which can preferably control the power generation and the engine load for a catalysis to always exhibit its function at an optimum with not only a state of charge in a vehicular battery but also a state of a catalysis taken into consideration, thus further improving exhaust gas compositions.

The above-described object can be achieved by providing a driving apparatus for a hybrid vehicle, comprising: an engine; a motor/generator having its rotary axle linked to an output axle of the engine; a battery electrically connected to the motor/generator; and a controller programmed: to calculate a target driving force [tFd], the target driving force [tFd] representing a target value of a vehicular driving force; to calculate a basic target engine speed [tNinb] on the basis of the target driving force, the basic target engine speed [tNinb] representing a basic target value of the engine speed; to calculate a power generation request quantity [tWg], the power generation request quantity [tWg] representing a power to be generated by the motor/generator; to calculate a basic target engine torque [tTeg] on the basis of the target driving force [tFd], the power generation request quantity [tWg], and the basic target engine speed [tNinb], the basic target engine torque [tTeg] representing an engine torque to be developed when an output required for a vehicular drive and for a power drive of the motor/generator is developed at the basic target engine speed [tNinb]; to calculate a limit torque [tTlim] during an occurrence of a power generation request on the basis of the basic target engine speed [tNinb], the limit torque [tTlim] during the occurrence of the power generation request representing a limit torque of the engine when the engine is driven at the basic target engine speed [tNinb], satisfying a demand for an exhaust performance of the engine; to set a target engine speed [tNin] to either the basic target engine speed [tNinb] or a value different from the basic target engine speed [tNinb] according to a result of comparison between the basic target engine torque [tTeg] and the limit torque [tTlim] during the occurrence of the power generation request; and to control the engine on the basis of the target engine speed [tNin].

The above-described object can also be achieved by providing a driving method for a hybrid vehicle, comprising: providing an engine; providing a motor/generator having its rotary axle linked to an output axle of the engine: providing a battery electrically connected to the motor/generator; calculating a target driving force [tFd], the target driving force [tFd] representing a target value of a vehicular driving force; calculating a basic target engine speed [tNinb] on the basis of the target driving force, the basic target engine speed [tNinb] representing a basic target value of the engine speed; calculating a power generation request quantity [tWg], the power generation request quantity [tWg] representing a power to be generated by the motor/generator; to calculate a basic target engine torque [tTeg] on the basis of the target driving force [tFd], the power generation request quantity [tWg], and the basic target engine speed [tNinb], the basic target engine torque [tTeg] representing an engine torque to be developed when an output required for a vehicular drive and for a power drive of the motor/generator is developed at the basic target engine speed [tNinb]; calculating a limit torque [tTlim] during an occurrence of a power generation request on the basis of the basic target engine speed [tNinb], the limit torque [tTlim] during the occurrence of the power generation request representing a limit torque of the engine when the engine is driven at the basic target engine speed [tNinb], satisfying a demand for an exhaust performance of the engine; setting a target engine speed [tNin] to either the basic target engine speed [tNinb] or a value different from the basic target engine speed [tNinb] according to a result of comparison between the basic target engine torque [tTeg] and the limit torque [tTlim] during the occurrence of the power generation request; and controlling the engine on the basis of the target engine speed [tNin].

DETAILED DESCRIPTION OF THE PREFERRED EMBODIMENTS

Reference will hereinafter be made to the drawings in order to facilitate a better understanding of the present invention.

Figure 1:
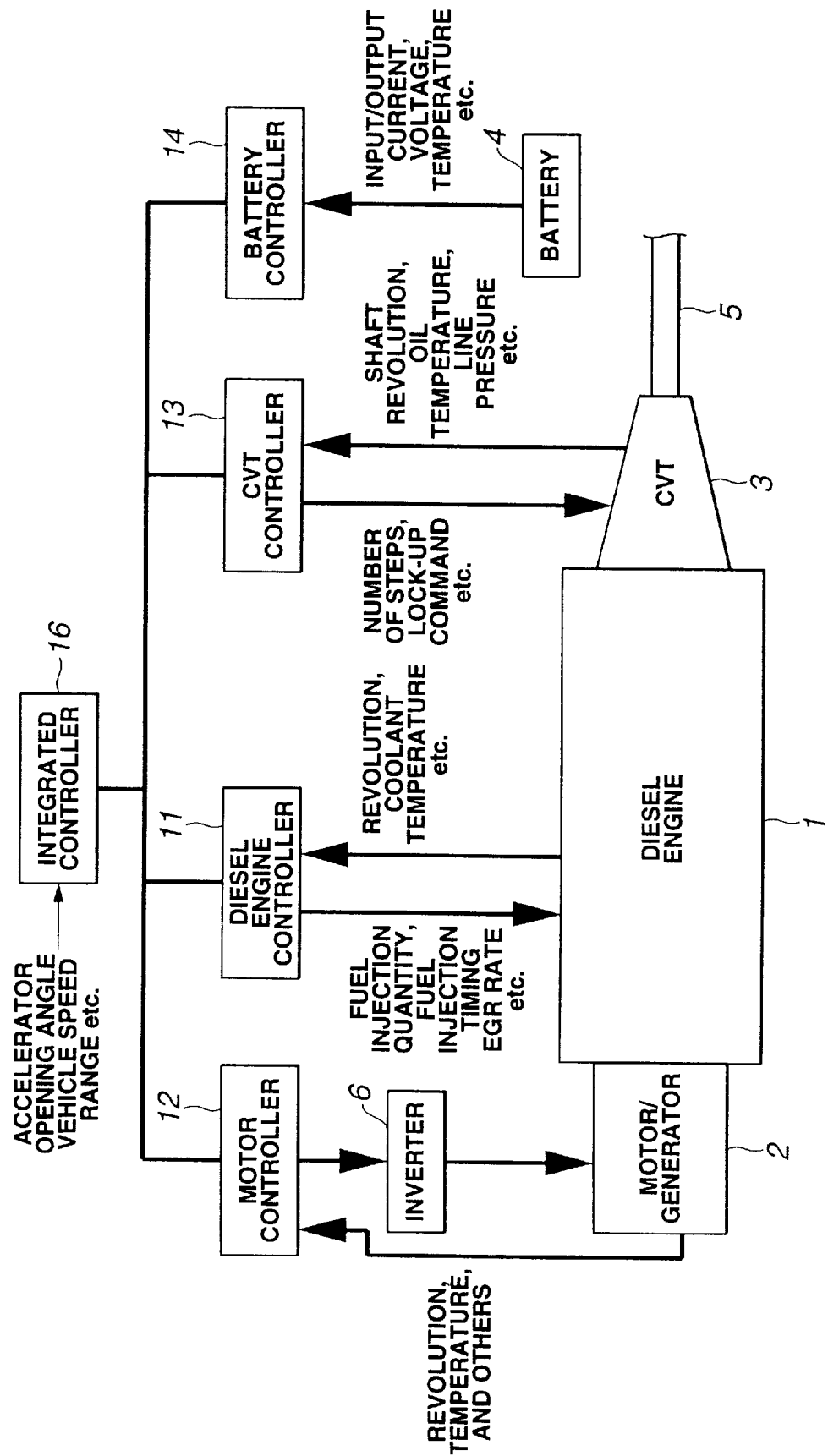
FIG. 1 is a rough configuration view of a hybrid vehicle to which a preferred embodiment of a driving apparatus according to the present invention is applicable.

FIG. 1 shows a preferred embodiment of a driving apparatus for a hybrid vehicle according to the present invention.

In FIG. 1, a Diesel engine 1 has an output axle linked to a motor/generator 2 (hereinafter, also referred simply to as a motor) and a transmission 3. A battery 4 is mounted in the hybrid vehicle. A drive shaft 5 is mutually coupled to an output shaft of an automatic transmission 3. The drive shaft 5 is linked to a vehicular drive system such as a reduction gear and a differential (not shown). The transmission 3 includes: a belt (or toroidal) continuously variable transmission (CVT) for varying a ratio of engine revolutions unlimitedly to transmit the varied ratio to the drive shaft 5: and a torque converter for transmitting the engine revolutions to the continuously variable transmission (CVT) 3 as a torque transmission element. A gear ratio of the transmission 3 (in the CVT 3, the gear ratio means a speed ratio) is varied at an unlimited stage within a predetermined speed ratio range in accordance with a command from a CVT controller 13.

In FIG. 1, an engine controller 11 controls the engine 1, a motor controller 12 controls the motor 2, a CVT controller 13 controls the transmission 3, a battery controller 14 controls the battery, an integrated controller 16 integrally controls each controller by supplying vehicular and engine driving parameters. Each controller 11, 12, 13, 14, and 16 is constituted by a microcomputer and its peripheral circuits. The microcomputer includes a CPU (Central Processing Unit), a ROM (Read Only Memory), a RAM (Random Access Memory), and an I/O (Input/Output) interface circuit. Various kinds of arithmetic/logic operations and control operations are performed by the respective controllers. The details of control operations by means of the respective controllers 11, 12, 13, 14, and 16 will be described later but a general description of the control operations will be made below.

That is to say, the (Diesel) engine controller 11 controls a fuel injection quantity, a fuel injection timing, and an EGR (Exhaust Gas Recirculation) rate on the basis of the driving parameters such as a vehicle speed and an accelerator opening angle (so-called, a load demand) supplied from the integrated controller 16, an engine speed, and an engine coolant temperature from the engine 1.

The motor controller 12 controls an operating condition of the motor 2 via an inverter 6. The inverter 6 is connected to the vehicular battery 4 via the motor controller 12. The motor controller 12 converts a direct current (DC) charge power of the battery 4 to an alternating current (AC) power when an assist output as will be described later occurs. Or alternatively, when an energy regeneration or a power generation request occurs, the alternating current power generation of the motor 2 is converted into a DC power to charge the battery 4. In addition, the motor controller 12 has a function to supply a motor operating state such as a motor revolution and a temperature of the motor 2 to the integrated controller 16.

The CVT controller 13 outputs a speed ratio command value (for example, a command value on the number of steps of a stepping motor to drive a control valve to vary the speed ratio) and a lock-up command signal to achieve a desired speed ratio on the basis of an information such as an oil temperature, a line pressure, and a detected value of the speed ratio from the transmission (CVT) and a driving state signal outputted from the integrated controller 16 to control the transmission 3.

The battery controller 14 monitors a battery condition such as a temperature, a voltage, and a representative value of a remaining capacity SOC (State Of Charge) of the battery 4 and the driving state signal from the integrated controller 16, supplies an electric power of the battery 4 to the monitor, or charges the battery by means of a power generation current through the motor 2. It is noted that a lithium-ion battery, a nickel-hydrogen battery, a lead-acid battery, and so on are applied as a battery.

Next, the preferred embodiment of the driving apparatus for the hybrid vehicle according to the present invention will be described with reference to FIG. 2.

The process shown in each flowchart described below is repeatedly executed at a constant interval of time (for example, 10 millisecond period) or at a timing synchronized with the engine revolution. In addition, since, for detecting method and detecting means, the vehicle speed and the accelerator opening angle used in the process shown in each flowchart are well known, the detailed description thereof will herein be omitted.

Figure 2:
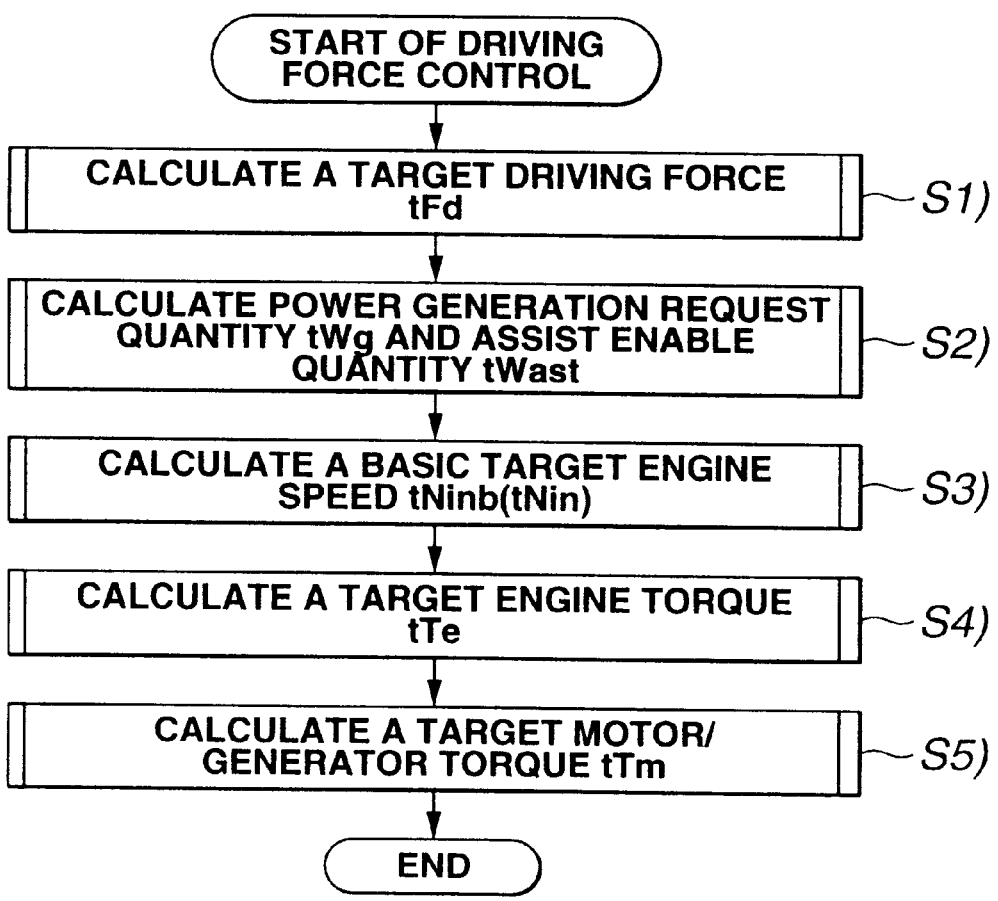
FIG. 2 is a general operational flowchart of a driving force control for an engine, a motor/generator, and a transmission executed in the driving apparatus shown in FIG. 1.

FIG. 2 shows a main routine of the driving force control for the engine 1, the motor 2, and the transmission 3.

In details, at a first step S1), the integrated controller 16 calculates a target driving force tFd. At the next step S2), the integrated controller 16 calculates a power generation request tWg or a motor assist enabling quantity (or a quantity of power which enables the motor 2 to assist the engine output) tWast. At the next step S3), the integrated controller 16 calculates a basic target engine revolution tNinb. At the next step S4), the integrated controller 16 calculates a target engine torque tTe. At the next step S5), the integrated controller 16 calculates a target torque tTm of the motor/generator (motor 2) and, thereafter, the present routine of FIG. 2 is ended.

As the result of a calculation process shown in FIG. 2, the engine 1, the motor 2, and the transmission 3 are appropriately controlled. The control contents at each step in FIG. 2 will be described below (as a subroutine).

Figure 3:
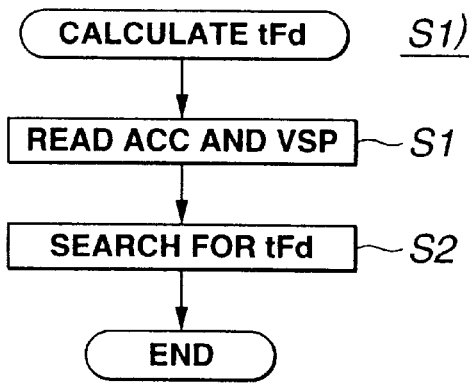
FIG. 3 is a detailed flowchart of a target driving force calculation process in a driving force control routine shown in FIG. 2.

FIG. 3 shows the subroutine of the step S1) in FIG. 2.

At a first step S1, the integrated controller 16 reads the accelerator opening angle ACC and the vehicular velocity VSP.

Figure 4:
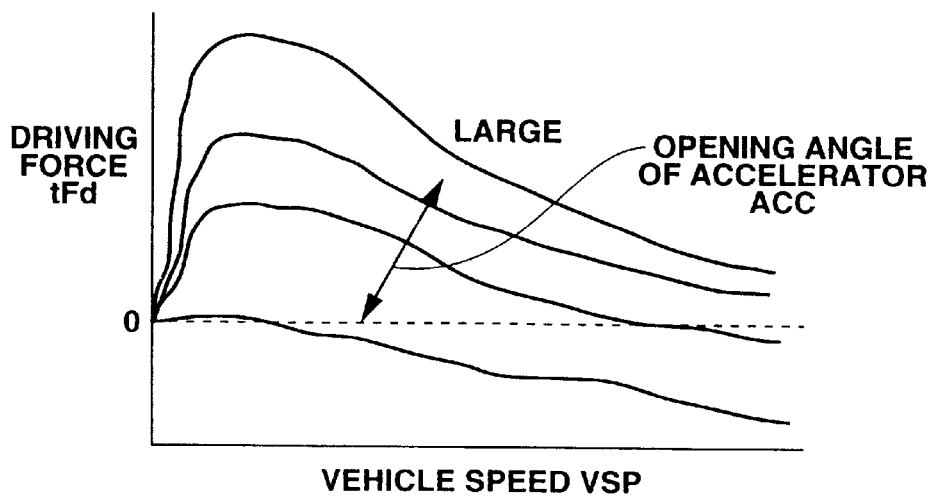
FIG. 4 is a characteristic graph representing a table of a target driving force tFd according to an accelerator opening angle ACC and a vehicular velocity (vehicle speed) VSP.

At a second step S2, the integrated controller 16 sets the target driving force tFd. This target driving force tFd is set by searching it from a table shown in FIG. 4 according to the vehicle speed VSP and the accelerator opening angle (the load demand) ACC.

Figure 5:
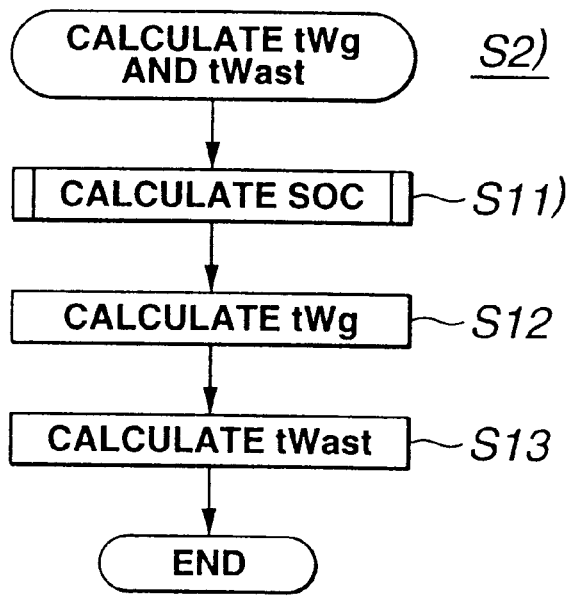
FIG. 5 is a detailed operational flowchart for calculating a power generation request quantity tWg and a motor assist enabling quantity tWast in the general flowchart shown in FIG. 2.

FIG. 5 shows the subroutine of the step S2) in FIG. 2 to calculate tWg and tWast.

At a first step S11), the integrated controller 16 calculates the battery charged state of SOC (State Of Charge) in the battery 4.

Figure 6:
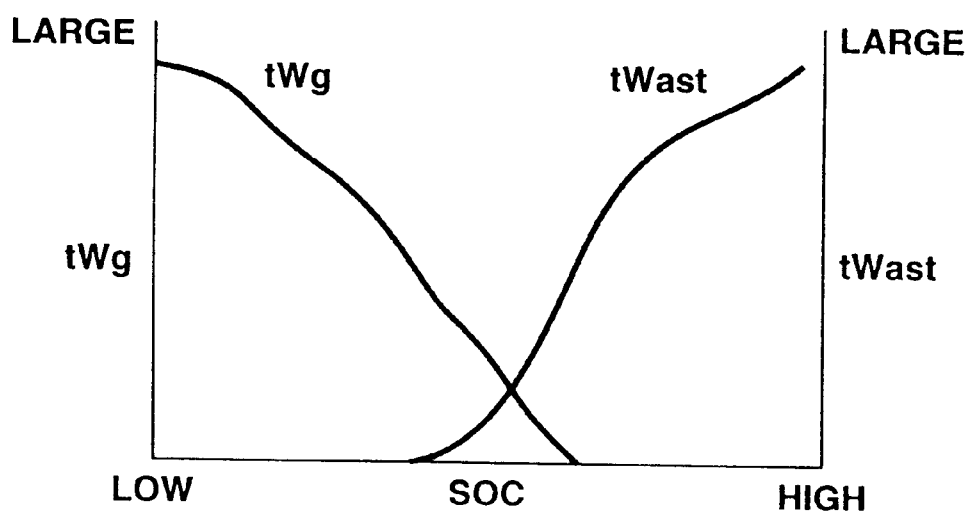
FIG. 6 is an integrally characteristic graph representing a table of both of the power generation request quantity tWg and the motor assist enabling quantity tWast from a battery charged state SOC (State Of Charge).

At the next step S12, the integrated controller 16 calculates the power generation request quantity tWg from a table shown in FIG. 6, for example, on the basis of the value of SOC calculated at the step S11).

At the next step S13, the integrated controller 16 calculates the assist enabling quantity tWast from a table search shown in FIG. 6.

Then, the present subroutine shown in FIG. 5 is ended.

As shown in FIG. 6, the SOC is set such that both of the power generation request quantity tWg and the assist enabling quantity tWast are overlapped together at an intermediate position of the value of SOC. For example, a position placed in proximity to the SOC at which both tWg and tWast are overlapped indicates a standard state of a battery charged state and indicates enable state of charge for both the power generation request quantity and the motor assist of power. These characteristics are set to suppress the exhaust gas quantity and the fuel consumption by increasing opportunities to enable an assistance of the motor 2 to the engine 1 over a range in which exhaust substances are augmented with various running state and vehicular use states taken into consideration.

Figure 7:
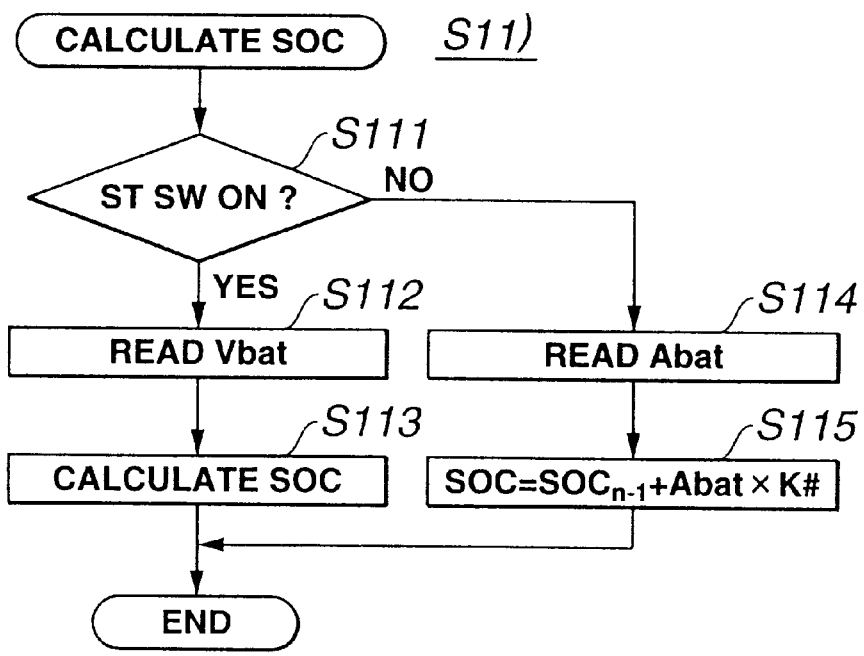
FIG. 7 is a more detailed flowchart for calculating the battery charged state (SOC) in a calculation process shown in FIG. 5.

FIG. 7 shows the battery charge state described at the step S11) shown in FIG. 5 with the lithium-ion battery used as the battery 4.

At a first step Sill, the integrated controller 16 determines whether an (engine) start switch ST is turned on.

If the start switch ST is turned on (Yes) at the step Sill, the routine goes to a step S112 at which a battery voltage Vbat is read.

At the next step S113, the integrated controller 16 calculates the SOC (State Of Charge).

If the start switch (ST) is turned to OFF at the step S111 (No), the routine goes to a step S114 at which a battery current Abat is read.

Figure 8:
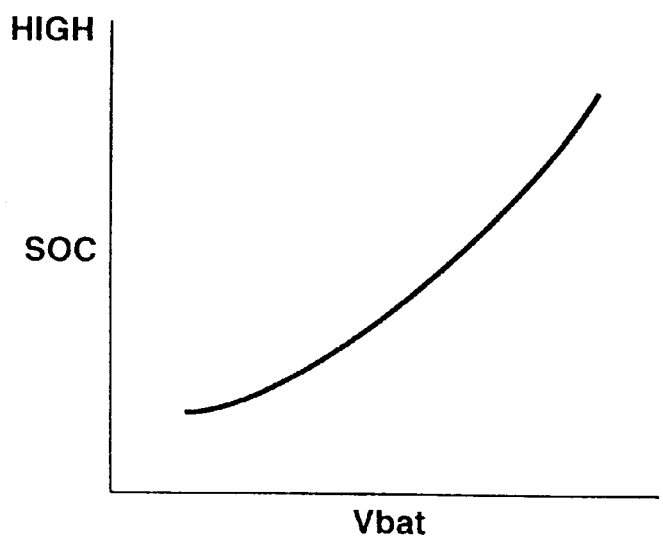
FIG. 8 is a characteristic graph representing a table of the battery charged state (SOC) from a battery (terminal) voltage Vbat.

At the step S115, the integrated controller 16 searches the value of SOC from a table shown in FIG. 8.

Since, at an initial stage of the start switch ST turned to ON or KEY ON, a load is not imposed on the battery 4, a correlation between the battery voltage Vbat and the SOC becomes high.

At the step S115, the integrated controller 16 calculates the SOC using the following equation (1):

$$SOC = SOC_{n-1} + Abat \cdot K\# \quad (1).$$

In the equation (1), $SOC_{n-1}$ denotes a previously detected value of the SOC and K# denotes a constant, and Abat denotes the read charge current of the battery 4.

It is noted that, at the step S112, the initial value of the SOC only at the initial stage of key on is set and, thereafter, the routine shown in FIG. 7 always goes to the step S114 and the next step S115 to calculate an accumulated value of the charge current of the battery 4 to derive the SOC.

Figure 9:
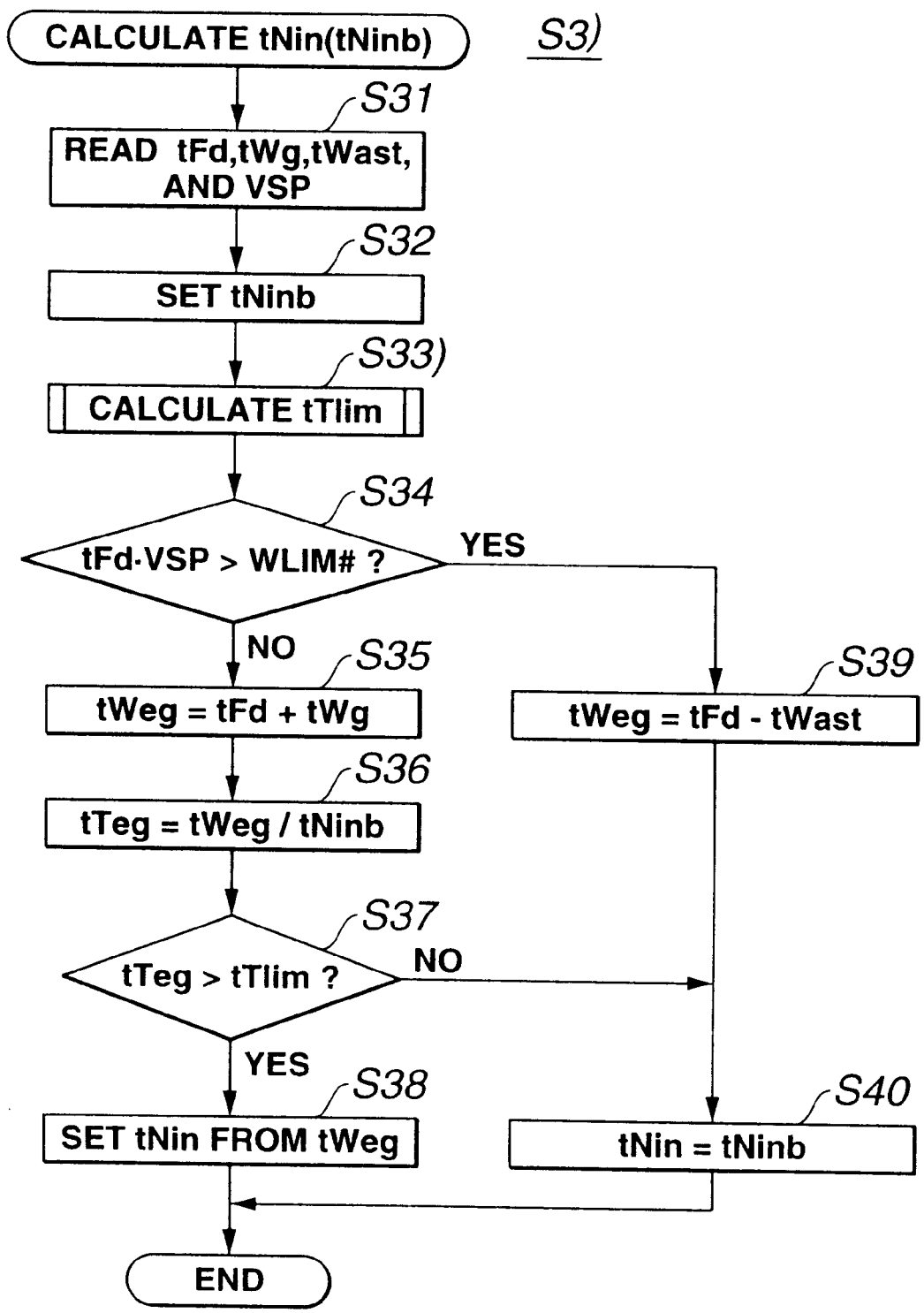
FIG. 9 is a detailed flowchart for calculating a target engine speed tNin (a basic target engine speed tNinb is included) in the general flowchart shown in FIG. 2.

FIG. 9 shows the detailed flowchart on the calculation process of the step S3) shown in FIG. 2 of the target engine speed tNin.

At a first step S31 of FIG. 9, the integrated controller 16 reads the target driving force tFd, the power generation request quantity tWg, the motor assist enabling quantity tWast, and the vehicular velocity (vehicle speed) VSP.

Figure 10:
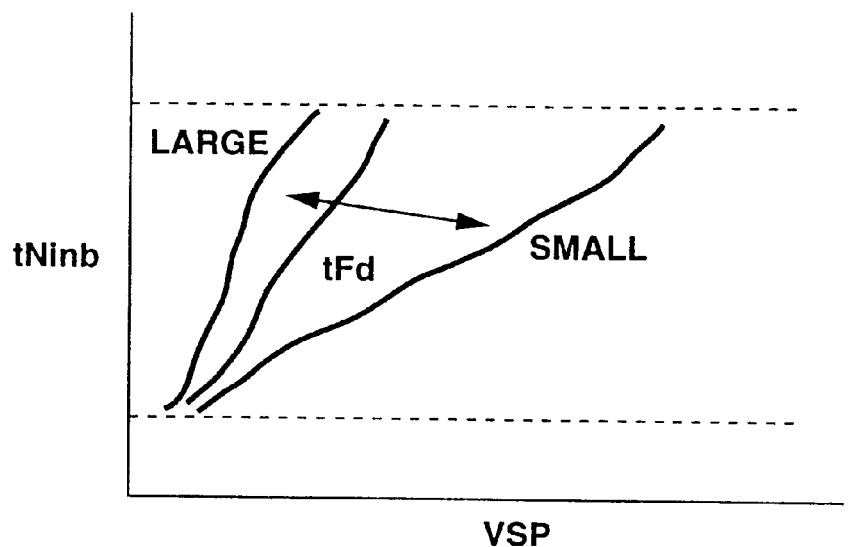
FIG. 10 is a characteristic graph representing a table of the basic target engine speed tNinb from the target driving force tFd and the vehicle speed VSP.

At the next step S32 of FIG. 9, the integrated controller 16 searches the basic target engine speed tNinb from a table shown in FIG. 10 according to the target driving force tFd and the vehicular speed VSP.

For example, the table shown in FIG. 10 is set to derive the target basic engine speed Ninb.

At the next step S33), the integrated controller 16 calculates the limit torque tTlim during the occurrence of the power generation request. For the details of the limit torque tTlim during the occurrence of the power generation request, refer to FIG. 12 which will be described later.

At a step S34, the integrated controller 16 compares the target driving force tFd multiplied by the vehicular velocity VSP with a predetermined reference value WLIM# to determine if tFd·VSP is larger than the predetermined reference value WLIM#.

If tFd·VSP>WLIM# at the step S34 (Yes), the routine goes to a step S39 at which tWeg=tFd−tWast as the driving force falling in an assistance request region since the motor power assistance to the engine output is needed.

If tFd·VSP≦WLIM# at the step S34 (No), the routine goes to a step S35 since the power generation is possible.

At the step S35, tWeg=tFd+tWg.

Figure 41:
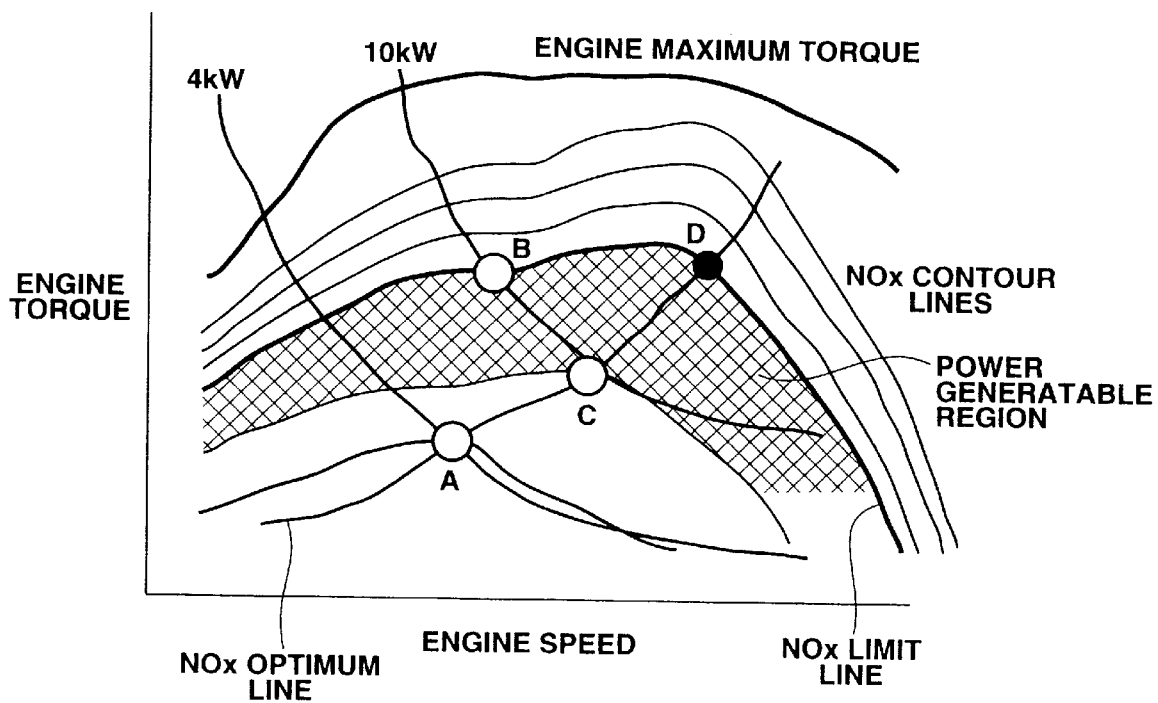
FIG. 41 is an engine drive characteristic diagram representing a driving characteristic according to the driving force control in the preferred embodiment according to the present invention.

This predetermined reference value WLIM# is, for example, set to an output value at a point of intersection between an exhaust limit line shown in FIG. 41 (a limit line on the exhaust composition quantity of NOx) and an exhaust optimum line (a line connecting the driving points at which the least exhaust quantity of NOx on equal output lines (NOx contour lines) is resulted). It is noted that the output value is a product between the engine torque and the engine speed at the intersection point D.

At the step S36, the integrated controller 16 calculates a basic target engine torque tTeg by dividing tWeg at the step S6 by the basic target engine speed tNinb.

At the next step S37, the integrated controller 16 compares the basic target engine torque tTeg with the limit torque Tlim during the occurrence in the power generation request to determine whether tTeg>tTlim.

If tTeg>tTlim (Yes) at the step S37, the routine goes to a step S38. At the step S38, the controller 16 sets the basic target engine speed tNin from the target engine output tWeg according to a search of a table shown in FIG. 11.

Figure 11:
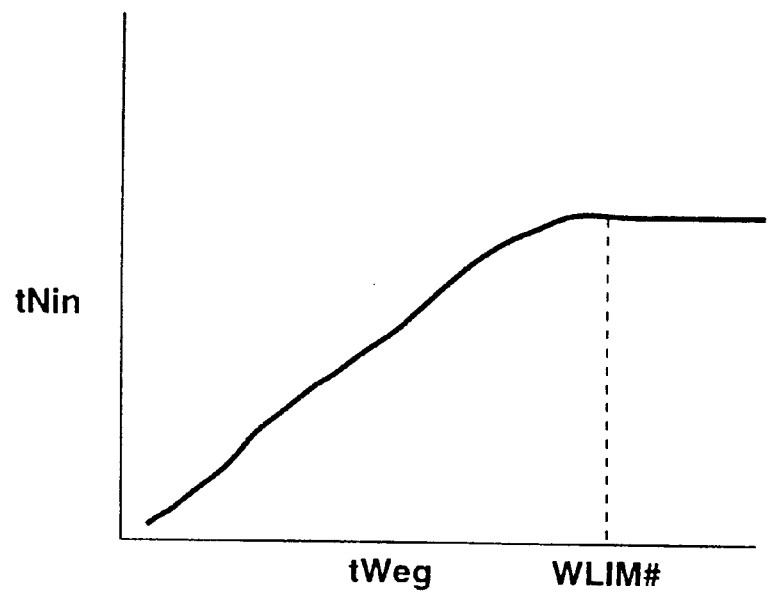
FIG. 11 is a characteristic graph representing a table of the target engine speed tNin according to the target engine output tWeg.

The table shown in FIG. 11 indicates a relationship between the engine output and the engine speed at a limit of an exhaust matter and represents the relationship between the engine output and the engine speed at any driving point on an NOx limit line shown in FIG. 41.

If tTeg<tTlim (No) at the step S37, the routine goes to a step S40 in which tNin is directly set to Ninb and the present routine shown in FIG. 9 is ended.

Figure 12:
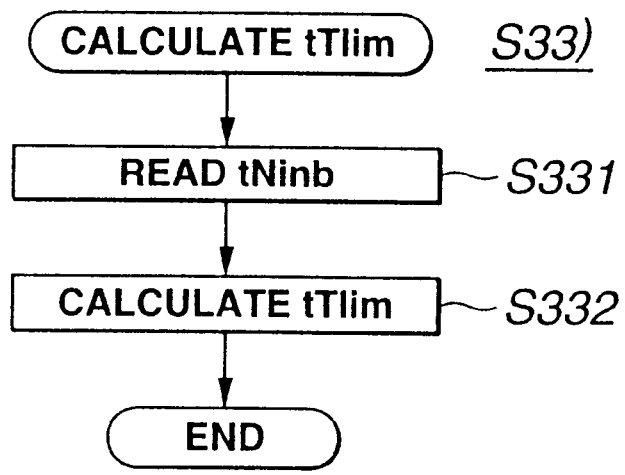
FIG. 12 is a more detailed flowchart for calculating a limit torque tTlim during an occurrence of a power generation request in the calculation process shown in FIG. 9.

FIG. 12 shows the detailed process of the calculation on the limit torque tTlim at the step S33) shown in FIG. 9 during the occurrence of the power generation request.

At a first step S331, the integrated controller 16 reads the basic target engine speed tNinb described with reference to FIG. 9.

Figure 13:
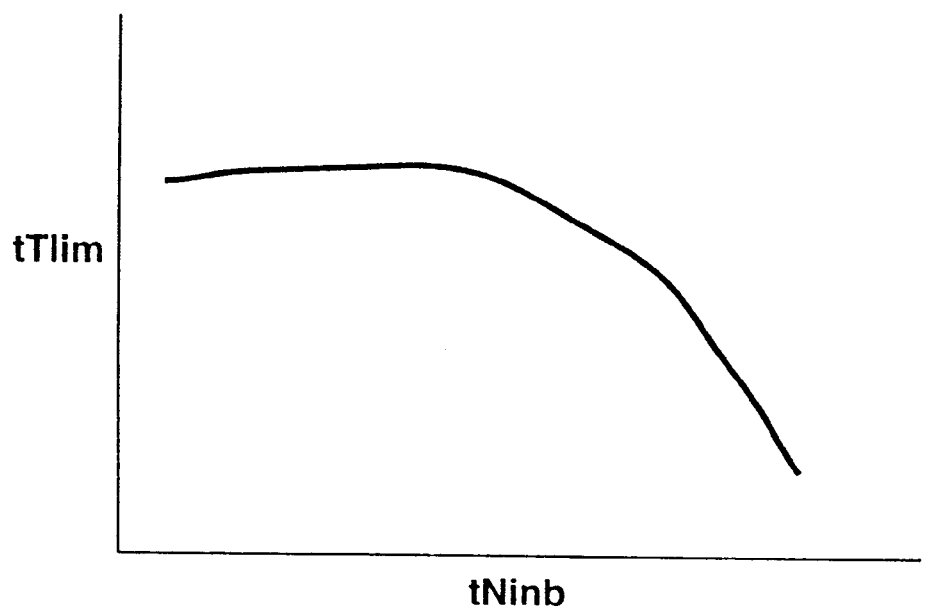
FIG. 13 is a characteristic graph representing a table of the limit torque tTlim during the occurrence of the power generation request from the basic target engine speed tNinb.

At the next step S332, the integrated controller 16 calculates the limit torque tTlim by referring to a table, for example, shown in FIG. 13 according to the read basic target engine speed tNinb and, thereafter, the present routine is ended.

It is noted that the table shown in FIG. 13 is a two-dimensional array of (tNinb, tTlim) on the NOx limit line (bold line) shown in FIG. 41.

Figure 14:
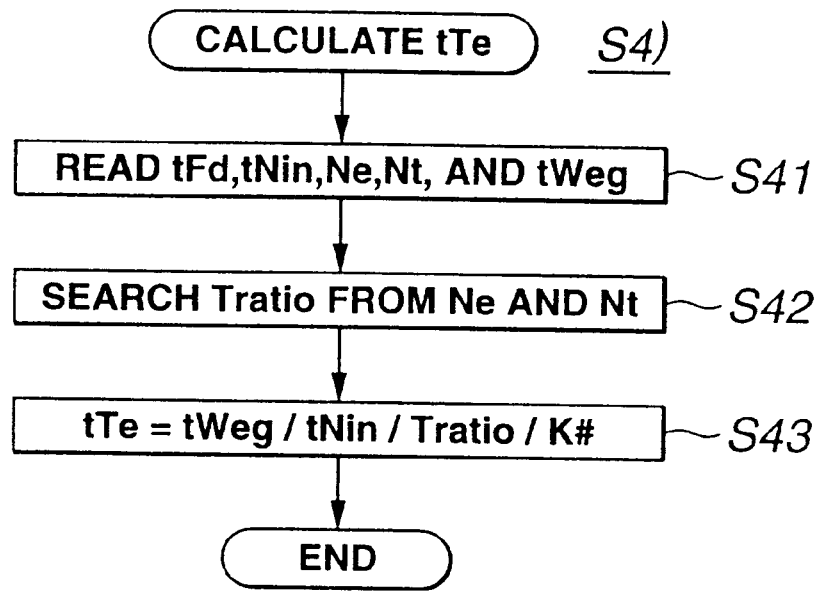
FIG. 14 is a detailed flowchart for calculating a target engine torque tTe in the general operational flowchart shown in FIG. 2.

FIG. 14 shows the detailed calculation process of the target engine torque tTe at the step S4) shown in FIG. 2.

At a first step S41, the integrated controller 16 reads the target driving force tFd, the target engine speed tNin, the actual engine speed Ne, a turbine speed Nt of a turbine of the torque converter, and the target engine output tWeg.

Figure 15:
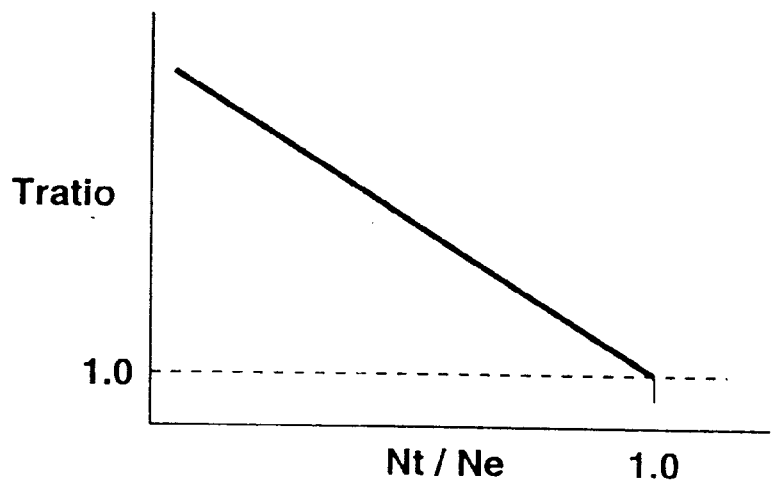
FIG. 15 is a characteristic graph representing a table of a torque converter torque ratio Tratio according to an engine speed Ne and a turbine speed Nt of a torque converter.

At the next step S42, the integrated controller 16 searches a table, for example, as shown in FIG. 15 for a value of a torque converter torque ratio Tratio according to the actual engine speed Ne and the turbine speed Nt (viz., Nt/Ne) to calculate the torque converter torque ratio Tratio.

At the next step S43, the integrated controller 16 calculates the target engine torque tTe according to the following equation (2):

$$tTe = tWeg/tNin/Tratio/K\#, \text{ wherein } K\# \text{ denotes the constant} \quad (2).$$

Then, the present routine is ended.

Figure 16:
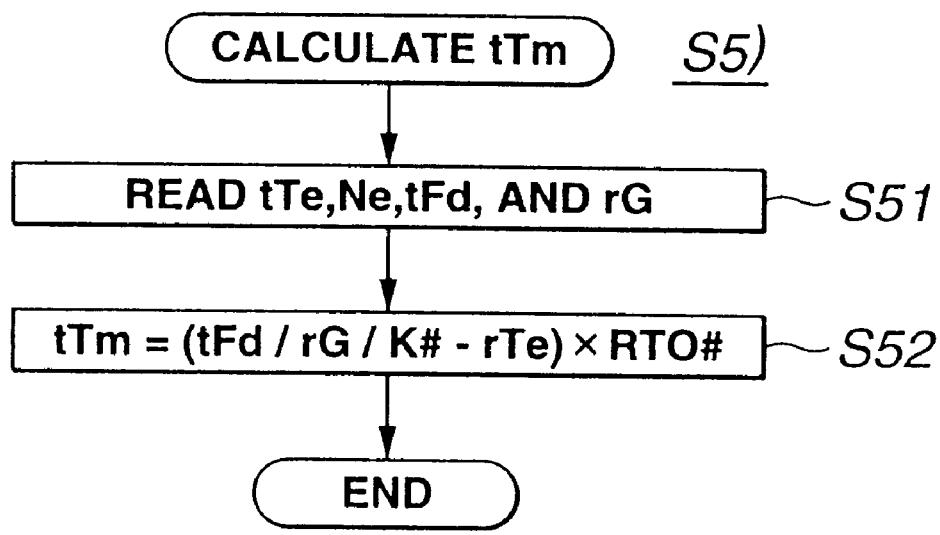
FIG. 16 is a detailed flowchart for calculating a target motor torque tTm in the general operational flowchart shown in FIG. 2.

FIG. 16 shows the detailed calculation process of the target motor torque tTm at the step S5) shown in FIG. 2.

At a first step S51, the integrated controller 16 reads an actual engine torque (an estimated value) rTe, the actual engine speed Ne, the target driving force tFd, and an actual speed ratio rG of the transmission 3.

The present routine shown in FIG. 16 is ended after the calculation of the target motor torque tTm according to the following equation (3):

$$(tFd/rG/K\# - rTe)RTO\# \quad (3).$$

In the equation (3), K# denotes the constant determined from an inherent value of the vehicular drive system such as a disc diameter and a final gear ratio and RTO# denotes a speed reduction ratio between the engine 1 and the motor 2. A first term within brackets ( ) in the equation (3) indicates a target value of the target driving force at it's engine axle from which the actual engine torque is subtracted to calculate a compensation for an engine torque development delay of the engine and to calculate a motor torque in the assist to the engine 1 and the power generation through the motor 2.

Figure 17:
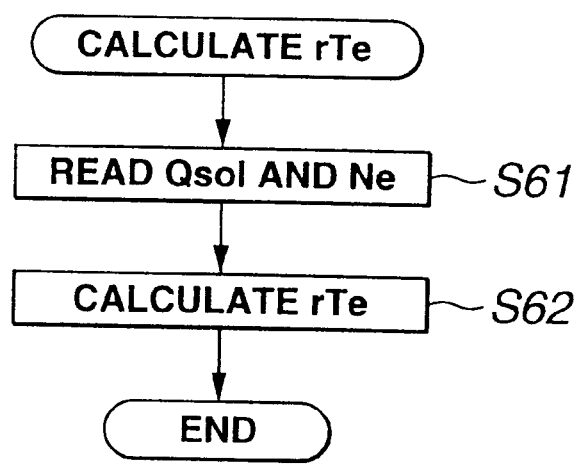
FIG. 17 is a more detailed flowchart for calculating an actually developed torque rTe of the engine for the detailed flowchart shown in FIG. 16.

FIG. 17 shows the detailed calculation process of the actual engine torque rTe of the engine 1 for the read process at the step S4) shown in FIG. 16.

At the step S61, the integrated controller 16 reads a fuel injection quantity Qsol for the engine 1 and the engine speed Ne.

Figure 18:
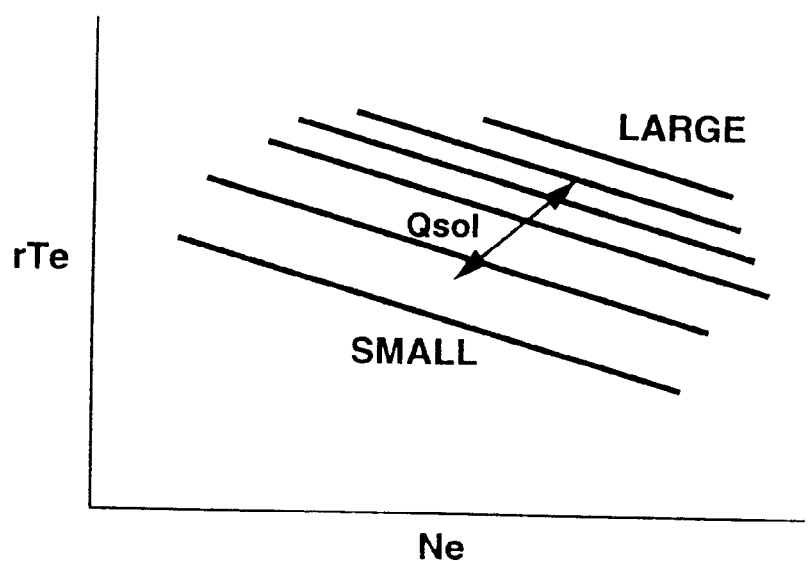
FIG. 18 is a characteristic graph representing a table of the actually developed torque rTe according to a fuel injection quantity Qsol and the engine speed Ne.

At the step S62, the integrated controller 16 searches for the actually developed engine torque rTe from a table shown in FIG. 18.

Figure 19:
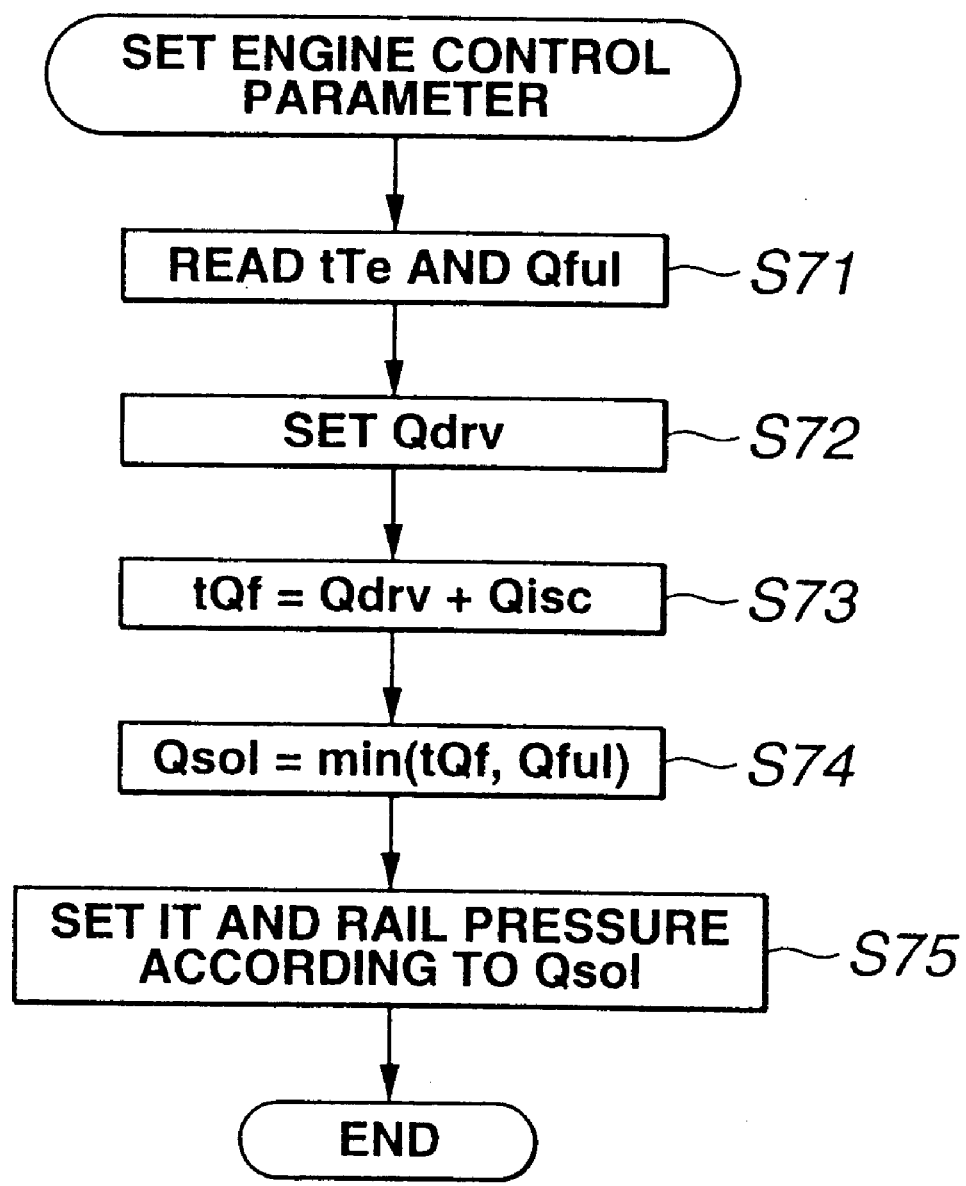
FIG. 19 is a detailed flowchart for setting an engine control parameter of a fuel injection timing IT and a rail pressure (tPrail) from the target engine torque tTe.

FIG. 19 shows a setting process of engine control parameters from the target engine torque tTe.

As representative values of the engine control parameters, the settings of the fuel injection quantity, a fuel injection timing, and a fuel injection pressure will be described below.

At a first step S71 in FIG. 19, the integrated controller 16 reads the target engine torque tTe and the engine speed Ne.

Figure 20:
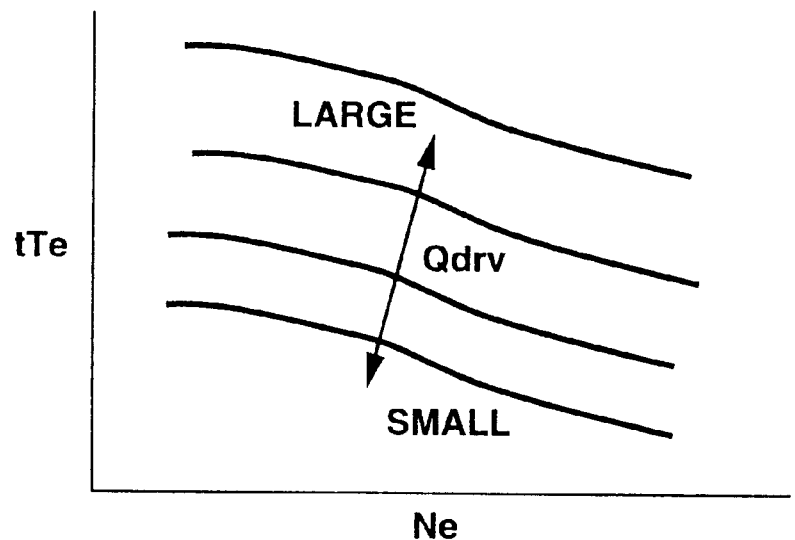
FIG. 20 is a characteristic graph representing a table of a torque target injection quantity Qdrv from the target engine torque tTe and the engine speed Ne.

At the next step S72, the integrated controller 16 searches and sets a torque target injection quantity Qdrv from, e.g., a map shown in FIG. 20 according to the read target engine torque tTe and the engine speed Ne.

At the next step S73, the integrated controller 16 adds the torque target injection quantity Qdrv to an idling injection quantity Qisc to provide a target injection quantity basic value tQf (tQf=Qdrv+Qisc).

At the next step S74, the integrated controller 16 selects one of either the target injection quantity basic value tQf or a maximum injection quantity Qful which is smaller than the other to derive the target fuel injection quantity Qsol (Qsol= min [tQf, Qful]).

Figure 21:
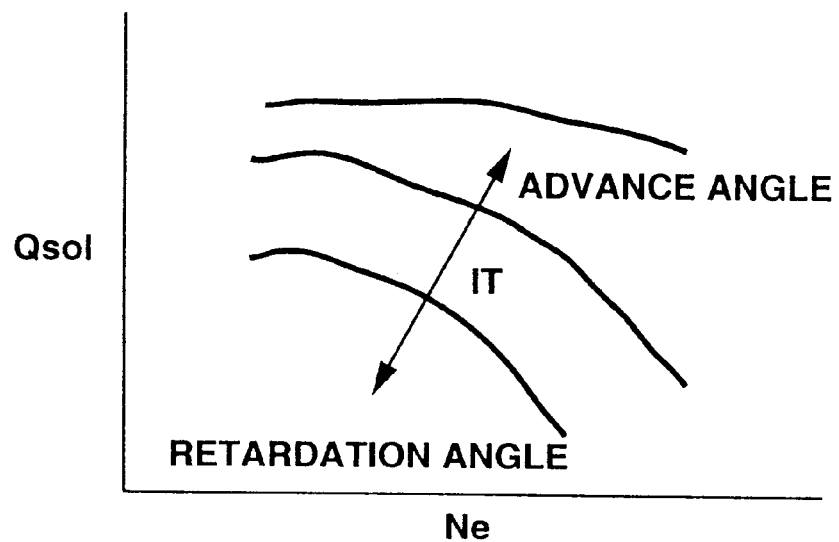
FIG. 21 is a characteristic graph representing a table of the fuel injection timing IT according to the target fuel injection quantity Qsol and the engine speed Ne.
Figure 22:
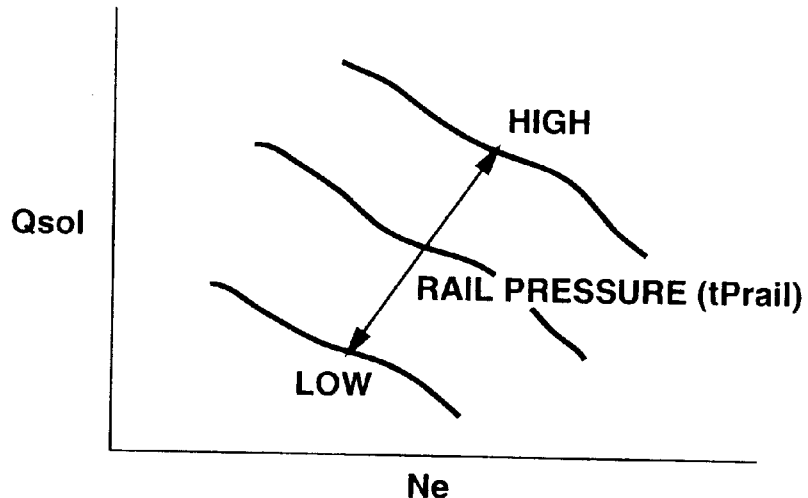
FIG. 22 is a characteristic graph representing a table of an injection pressure tPrail from the target fuel injection quantity Qsol and the engine speed Ne.

At the next step S75, the integrated controller 16 searches and sets the fuel injection timing IT and the target injection pressure tprail according to the target fuel injection quantity Qsol and the engine speed Ne from respective table maps, for example, shown in FIGS. 21 and 22.

FIG. 21 shows the table on IT according to Ne and Qsol.

FIG. 22 shows the table on tPrail according to Ne and Qsol.

Figure 23:
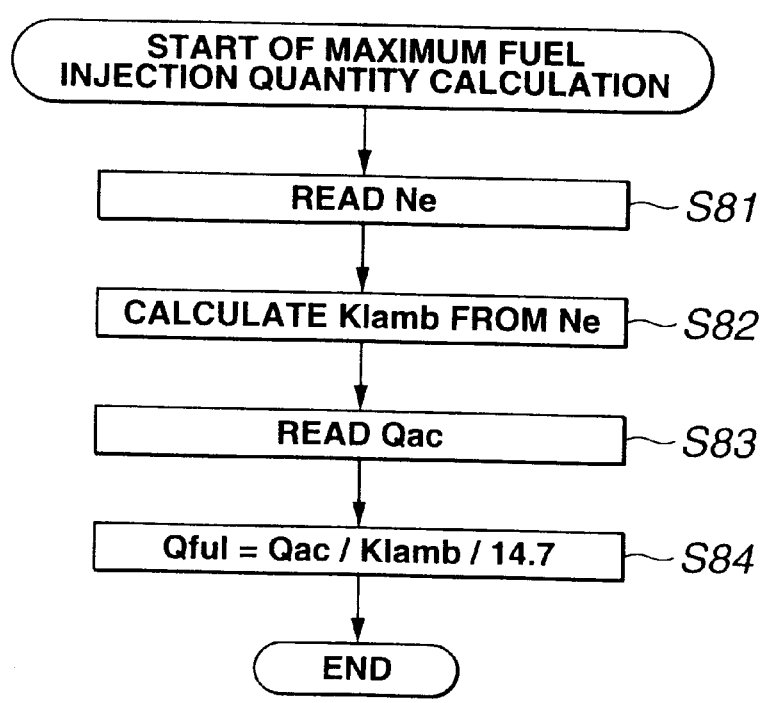
FIG. 23 is a detailed flowchart for calculating a maximum injection quantity basic value Qful.

FIG. 23 shows the detailed calculation process of calculating a maximum injection quantity basic value of Qful.

At a first step S81, the integrated controller 16 reads the engine speed Ne.

Figure 24:
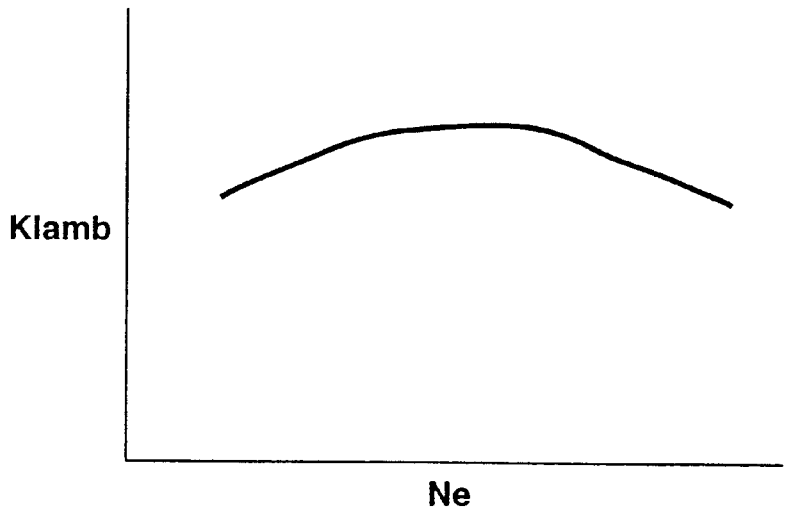
FIG. 24 is a characteristic graph representing a table of a limit fuel-air mixture ratio (F/A ratio) Klamb from the engine speed Ne.

At the next step S82, the integrated controller 16 calculates a limit fuel-air mixture ratio (F/A ratio) Klamb which accords with the engine revolution from a table search, for example, as shown in FIG. 24.

At the next step S83, the integrated controller 16 reads a cylinder intake air quantity Qac as will be described with reference to FIG. 25.

At the next step S84, the integrated controller 16 calculates the maximum injection quantity Qful; Qful=Qac/Klamb/14.7 as described in the step S84 of FIG. 23.

Then, the present routine is ended.

Figure 25:
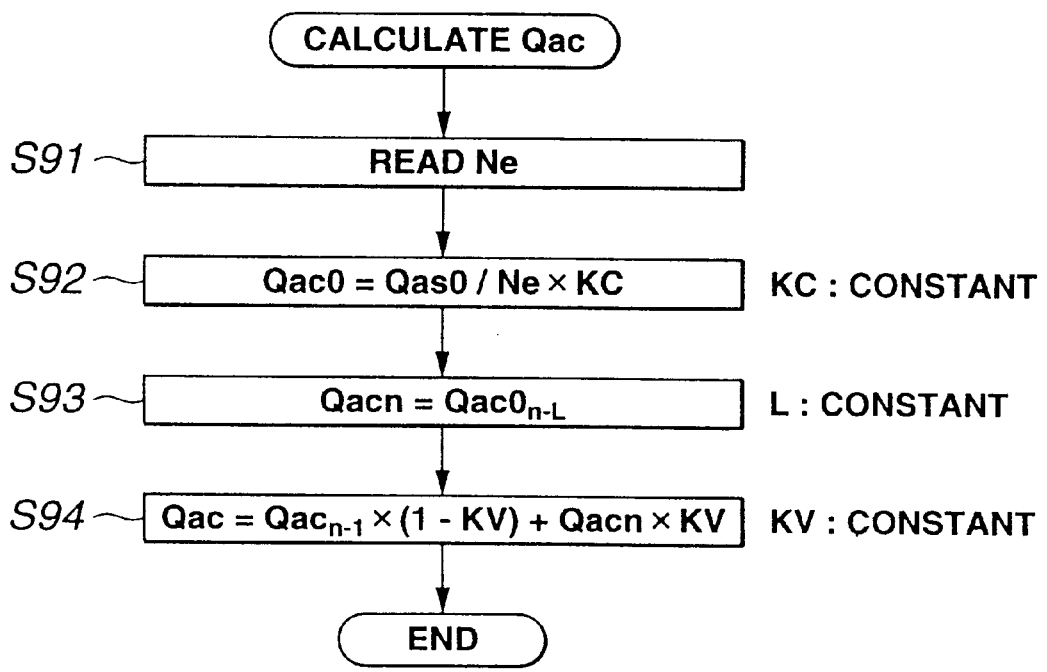
FIG. 25 is a more detailed flowchart for calculating a cylinder intake air quantity Qac in the calculation process shown in FIG. 23.

FIG. 25 shows the detailed calculation process of the cylinder intake air quantity Qac.

At a first step S91, the engine speed Ne is read.

At the next step S92, the integrated controller 16 calculates an intake air quantity Qac0 per cylinder according to an equation given as Qac0=Qas0/Ne·KC using an airflow meter detection flow quantity Qas0.

At the next step S93, the integrated controller 16 performs a buffer processing by a predetermined number of times L. This buffer processing is a transport delay processing from an airflow meter to a collector inlet. This result is set to Qacn (a collector inlet air quantity).

At the next step S94, the integrated controller 16 executes such a first order delay processing as Qac=Qacn-1·(1−kV)+ Qacn·kV - - - (4), as shown in the process block of the step S94 shown in FIG. 25 to calculate the cylinder intake air quantity Qac.

This is a process to form a dynamic calculation within the collector.

In the equation (4), KC and KV denote constants and Qcn−1 denotes a previous collector inlet quantity of Qacn.

Figure 26:
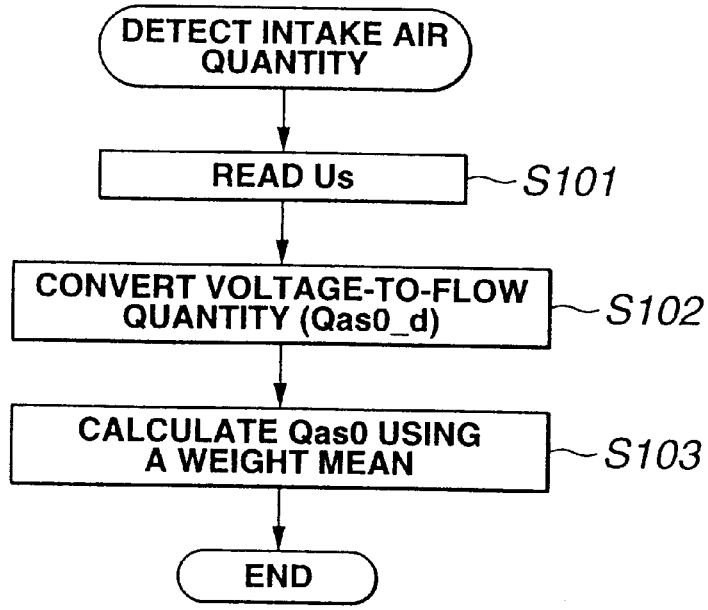
FIG. 26 is a detailed flowchart for calculating an airflow meter detection flow quantity Qsa0 in the calculation process in FIG. 25.

FIG. 26 shows a calculation process of the intake air quantity using the airflow meter, viz., the airflow meter detection flow quantity Qas0.

At a first step S101, the integrated controller 16 reads an output voltage Us derived from the airflow meter.

Figure 27:
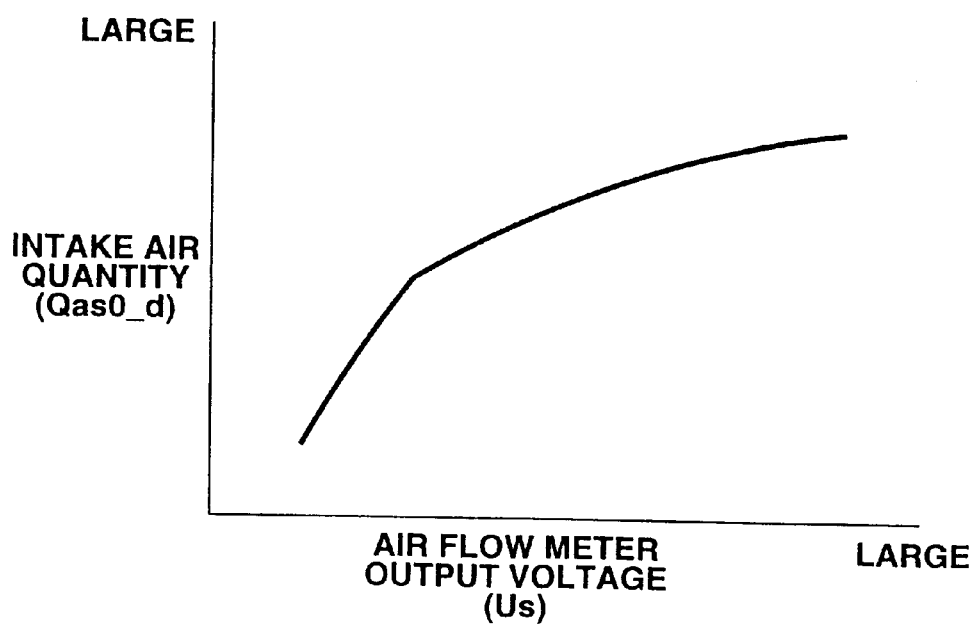
FIG. 27 is a characteristic graph representing a table of a flow quantity value Qas0_d from an airflow meter output voltage Us.

At the next step S102, the integrated controller 16 determines a flow quantity value Qas0_d using a voltage-flow quantity conversion table, for example, as shown in FIG. 27.

At the next step S103, a weight averaging to cancel intake air pulsation is performed to derive the airflow meter detection flow quantity Qas0.

Figure 28:
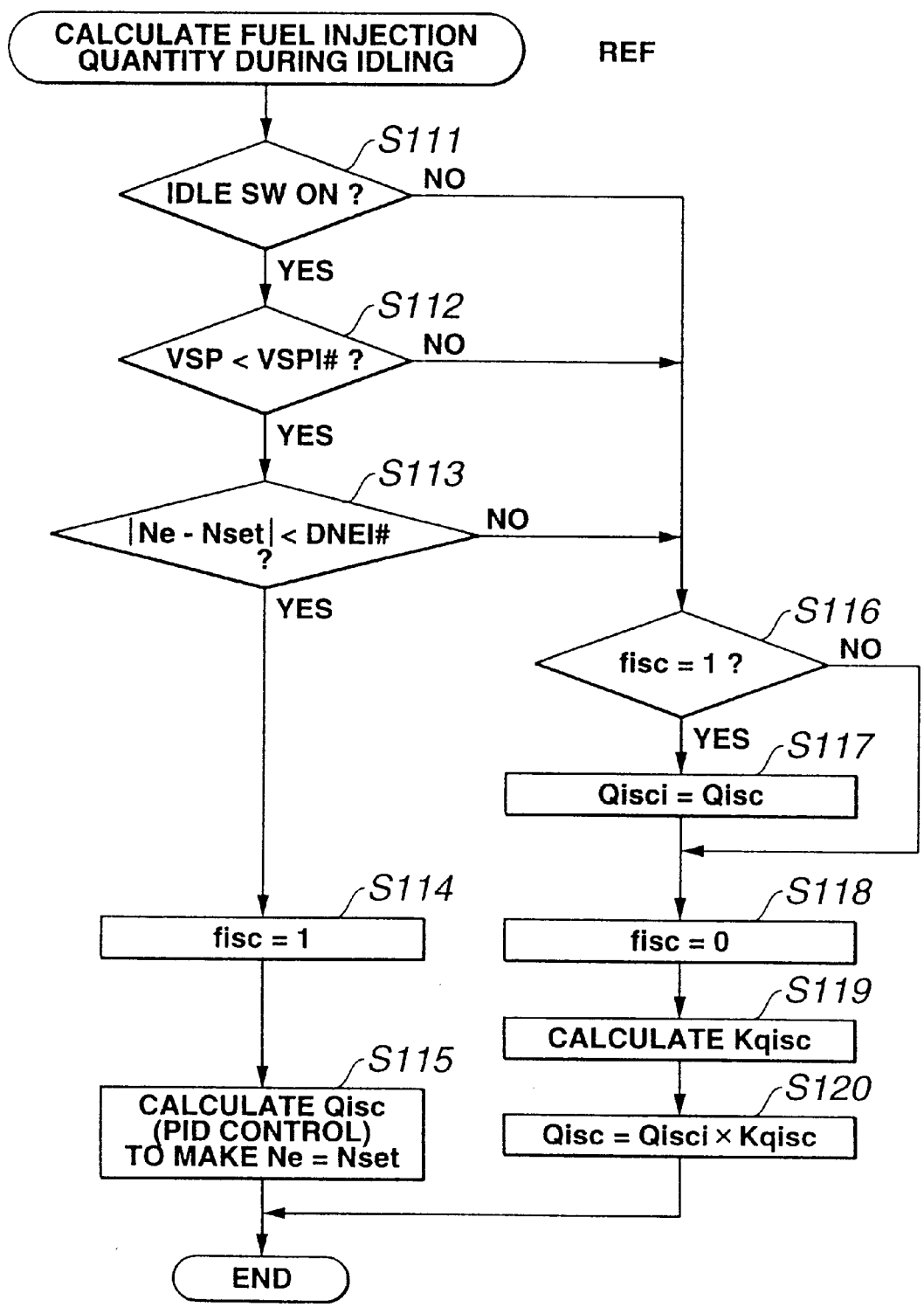
FIG. 28 is a detailed flowchart for calculating an idling fuel injection quantity Qisc during an engine idling.

FIG. 28 shows a calculation process of the idling fuel injection quantity Qisc.

At a first step S111, the integrated controller 16 determines whether an idle switch IDLE SW is presently turned on, namely, an accelerator pedal is released.

If the idle switch IDLE SW is ON state (Yes) at the step S111, the routine goes to a step S112. At the step S112, the integrated controller 16 determines if the vehicular velocity VSP is lower than a predetermined reference value (VSPI#), i.e., VSP<VSPI#. If VSP<VSPI# (Yes) at the step S112, the routine goes to a step S113.

If the idle switch is turned off (No) at the step S111, the routine goes to a step S116.

If VSP≧VSPI# (No) at the step S112, the routine goes to the step S116.

If the idle switch is turned off (No) at the step S111, the routine goes to the step S116.

If VSP≧VSPI# (yes) at the step S112, the routine goes to the step S113.

If VSP≧VSPI# (No) at the step S111, the routine goes to the step S116.

At the step S113, the integrated controller 16 determines if |Ne−Nset|<DNEI# (an absolute difference between the engine speed Ne and the idling target engine speed Nset is below a predetermined reference value (DNEI#)).

If |Ne−Nset|<DNEI# (yes) at the step S113, the routine goes to a step S114.

At the step S114, fisc (an idle speed control state flag) is set to 1 (fisc=1).

At the step S115, the integrated controller 16 performs a feedback control for the injection quantity so that the engine speed Ne is made substantially equal to the target speed Nset and the present routine shown in FIG. 28 is ended.

On the other hand, at the step S116, the integrated controller 16 determines whether fisc=1, viz., the engine falls previously in the ISC (idling speed control) state. If the state flag fisc is set to "1" (Yes) at the step S116, the routine goes to a step S117 in which Qisci=Qisc, wherein Qisc denotes a final injection quantity Qisc during the engine idling speed control. If fisc≠1 (No) at the step S116, the routine jumps to a step S118.

At the step S118, fisc=0.

Figure 31:
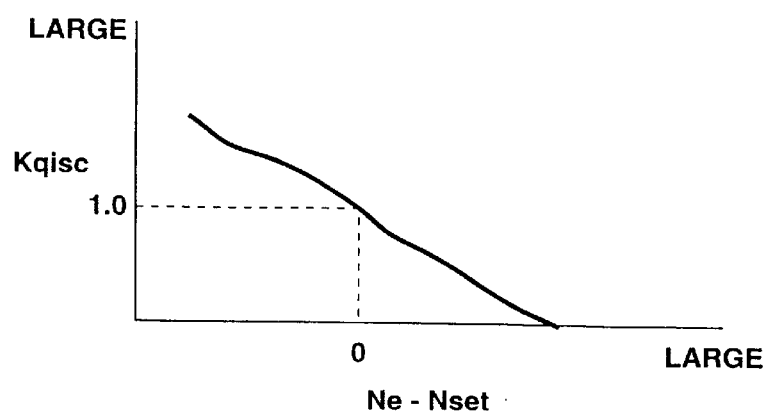
FIG. 31 is a characteristic graph representing a table of a correction coefficient Kqisc with respect to the idle fuel injection quantity Qisc from the engine speed Ne.

At the next step S119, the integrated controller 16 calculates a correction coefficient Kqisc for the injection quantity Qisc, for example, as shown in FIG. 31 from a table according to the engine speed Ne.

At a step S120, the integrated controller 16 calculates the idling fuel injection quantity Qisc according to the following equation (5): Qisc=Qisi·Kqisc - - - (5) and the present routine is ended.

Figure 29:
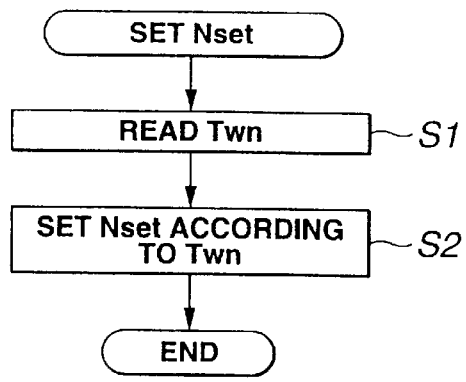
FIG. 29 is a detailed flowchart for calculating a target idling speed Nset for the calculation process in FIG. 28.

FIG. 29 shows the detailed calculation process of the target engine idling speed Nset.

At a first step S1, the integrated controller 16 reads an engine coolant temperature Twn.

Figure 30:
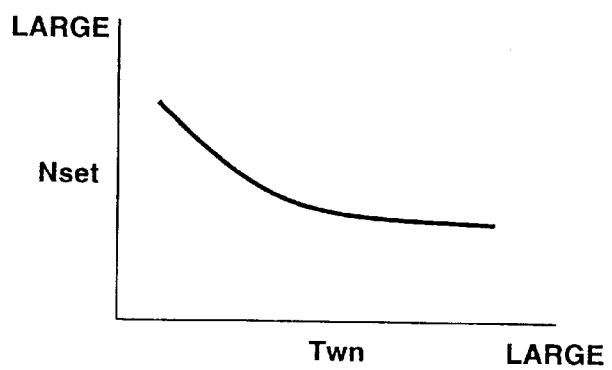
FIG. 30 is a characteristic graph representing a table of the target idling speed Nset from an engine coolant temperature Twn.

At the next step S2, the integrated controller 16 searches the target idling speed Nset from a table, for example, as shown in FIG. 30 and the present routine is ended. For example, in a case where the engine is automatically stopped during the engine idling (so-called, an idle stop), the target engine idling speed Nset is zeroed.

Figure 32:
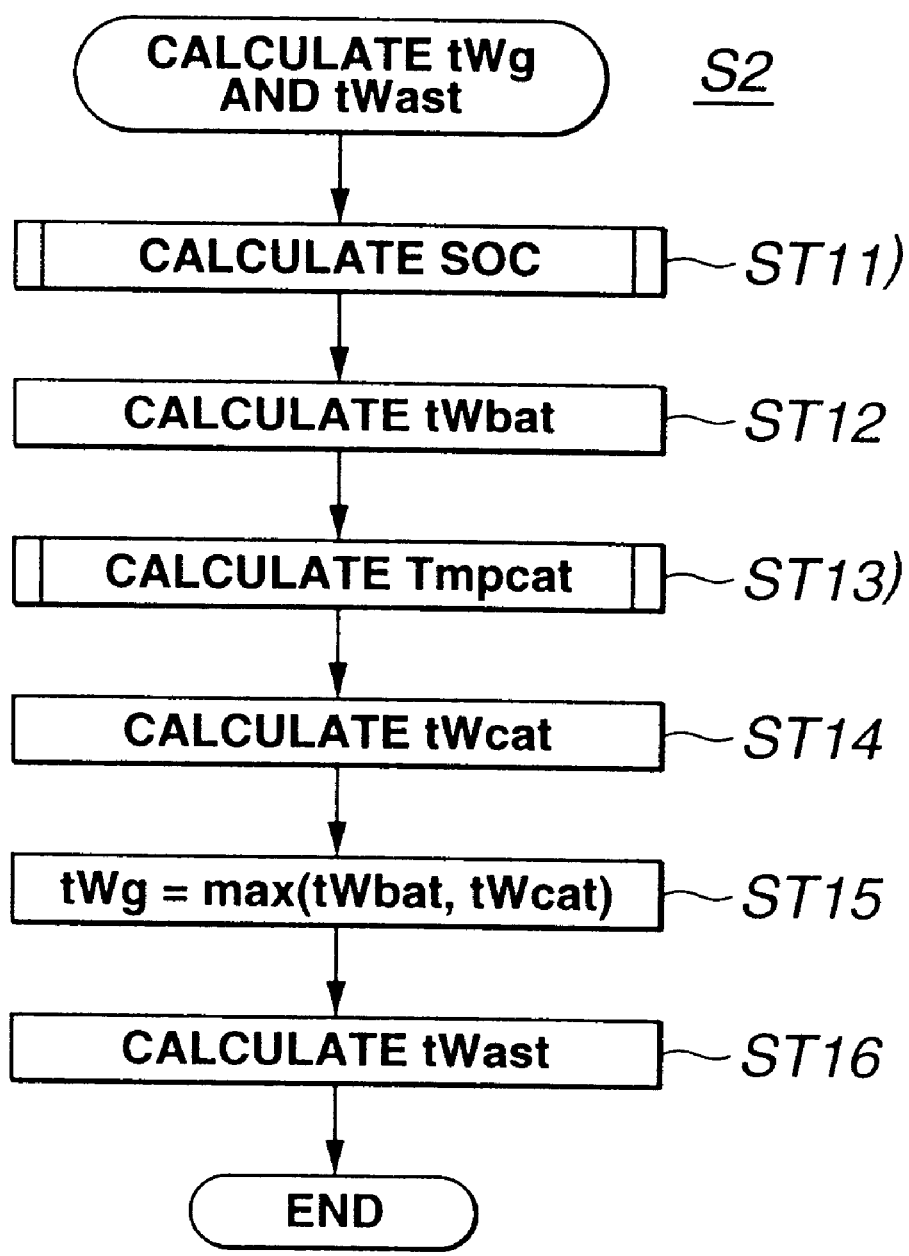
FIG. 32 is a detailed flowchart of another example for calculating the power generation request quantity tWg and the motor assist enabling quantity tWast in the general flowchart shown in FIG. 2.

FIG. 32 shows another example of the calculation process of the power generation request quantity tWg and the motor assist enabling quantity tWast at the step S2 shown in FIG. 3.

At a step ST11), the integrated controller 16 calculates the battery charged state of SOC. The calculation of the battery charged state SOC is the same as shown in FIG. 7 (the content of the step ST11) is the same as the step S11) shown in FIG. 7).

At the next step ST12, the integrated controller 16 calculates a battery request power generation tWbat from the SOC. The battery request power generation tWbat is searched from a table on the power generation request quantity tWg, for example, as already shown in FIG. 6 (tWg tWbat).

At the next step ST13), the integrated controller 16 calculates a temperature on the catalysis (a catalytic converter temperature) Tmpcat which will be described later.

Figure 33:
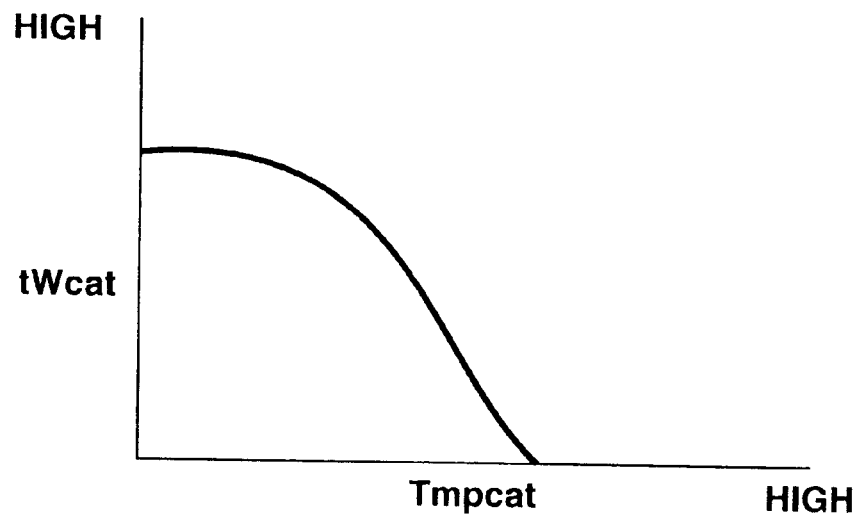
FIG. 33 is a characteristic graph of a table of a catalytic converter warm-up demand power generation tWcat from a catalytic converter temperature Tmpcat.

At the next step ST14, the integrated controller 16 searches a table, for example, shown in FIG. 33 from the catalytic converter temperature Tmpcat for a catalytic converter warm-up demand power generation tWcat.

At the next step ST15, the integrated controller 16 selects either one of the battery request power generation tWbat or the catalytic converter warm-up demand power generation tWcat which is larger than the other as the power generation request quantity tWg=max [tWbat, tWcat].

At the next step ST16, the assist enabling quantity tWast is searched from the table as already shown in FIG. 6. Then, the present routine shown in FIG. 32 is ended.

It is noted that the table setting as shown in FIG. 33 make the catalytic converter warm-up demand power generation tWcat in a vicinity to a temperature at which the catalysis of the catalytic converter is activated. If the temperature on the catalytic converter is lower than this temperature at which the catalysis is activated, the engine load is increased and the power generation is increased so as to increase the catalytic converter temperature.

Figure 34:
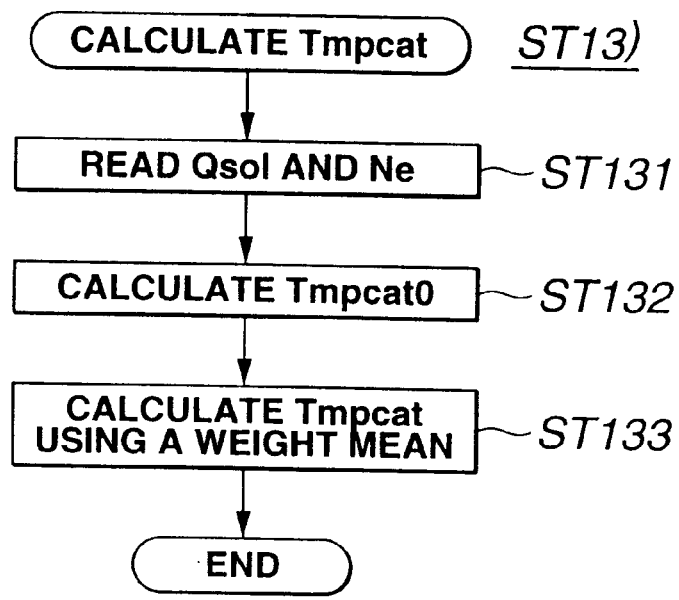
FIG. 34 is a more detailed flowchart for calculating the catalytic converter (warm-up) temperature Tmpcat in the calculation process in FIG. 32.

FIG. 34 shows the detailed calculation process for the catalytic converter temperature Tmpcat at the step ST13) as described above with reference to FIG. 32.

At a first step ST131, the integrated controller 16 reads the fuel injection quantity Qsol and the engine speed Ne.

Figure 35:
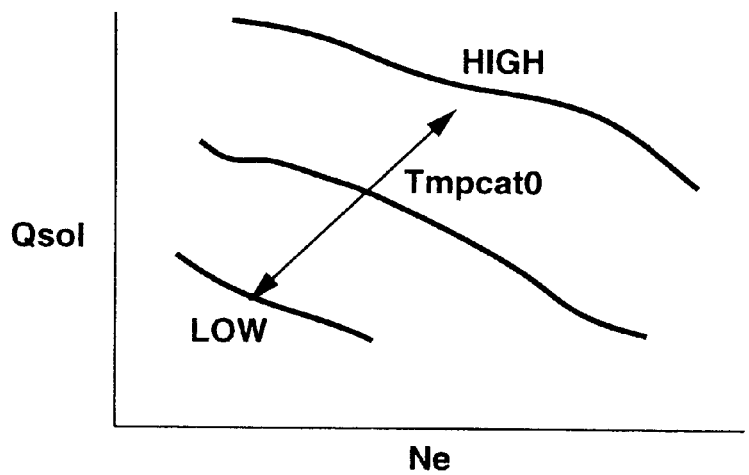
FIG. 35 is a characteristic graph representing a table of a basic exhaust temperature Tmpcat0 from the fuel injection quantity Qsol and the engine speed Ne.

On the basis of these values Qsol and Ne, the integrated controller 16 searches a catalytic converter temperature estimated value Tmpcat0 from a map shown in, for example, FIG. 35, at the next step ST132.

At the next step ST133, the integrated controller 16 performs a weight mean averaging for a thermal inertia with respect to Tmpcat0 and the present routine is ended.

Figure 36:
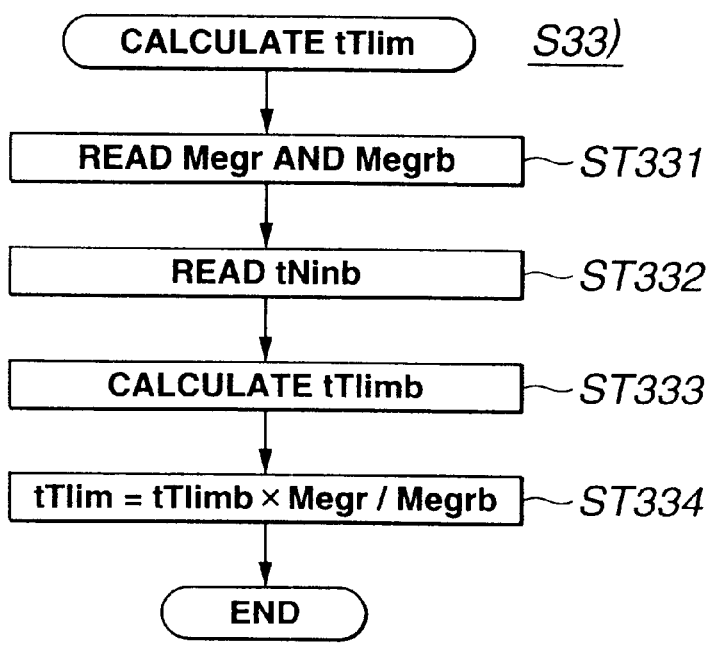
FIG. 36 is a more detailed flowchart for calculating another example of calculating the limit torque tTlim during the occurrence of the power generation request shown in the calculation process shown in FIG. 9.

FIG. 36 shows another processing example of the limit torque tTlim during the occurrence of the power generation.

At a first step ST331, the integrated controller 16 reads a target EGR rate Megr and the basic target EGR rate Megrb.

At the next step ST332, the integrated controller 16 reads the basic target EGR rate Megrb.

At the next step ST133, the integrated controller 16 calculates a basic limit torque tTlimb by referring to the table already shown in FIG. 13.

At the next step ST334, the integrated controller 16 calculates the following equation to derive the target limit torque; tTlim=tTlimb·Megr/Megrb - - - (6) and the present routine (S33)) is ended.

It is noted that Megr denotes a final target EGR rate and Megrb denotes an EGR rate initially set searched from the map and various corrections are added from the final target EGR rate Megr to the initially set EGR rate Megrb as will be described later.

Therefore, the basic limitat torque tTlimb is set according to an exhaust characteristic under a standard condition after the warm-up of the engine and various corrections of the EGR rate which would largely affect an exhaust performance taken into consideration.

Figure 37:
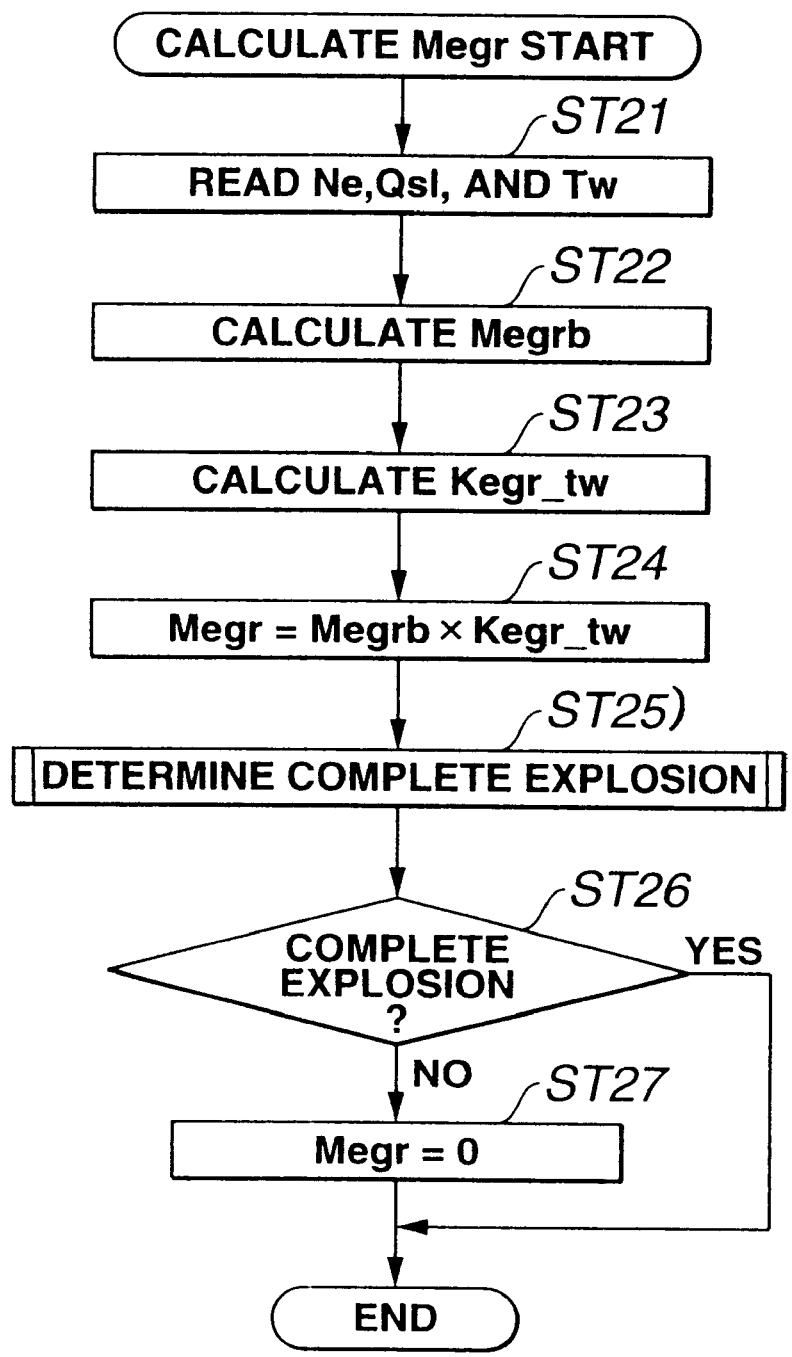
FIG. 37 is a detailed flowchart for calculating a target EGR rate Megr.

FIG. 37 shows the detailed calculation process of the target EGR rate Megr described with reference to FIG. 36.

At a first step ST21, the integrated controller 16 reads the engine speed Ne the fuel injection quantity Qsol, and the engine coolant temperature Tw.

Figure 38:
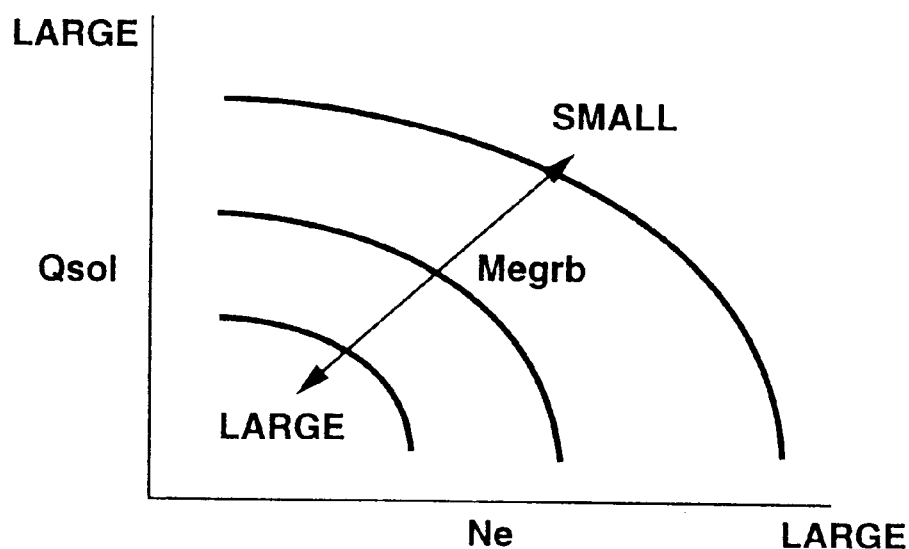
FIG. 38 is a characteristic graph representing a table of a basic target EGR rate Megrb from the engine speed Ne and the fuel injection quantity Qsol.

At the next step ST22, the integrated controller 16 searches a table, for example, shown in FIG. 38 for the basic target EGR rate Megrb according to the engine speed Ne and the fuel injection quantity Qsol.

Figure 39:
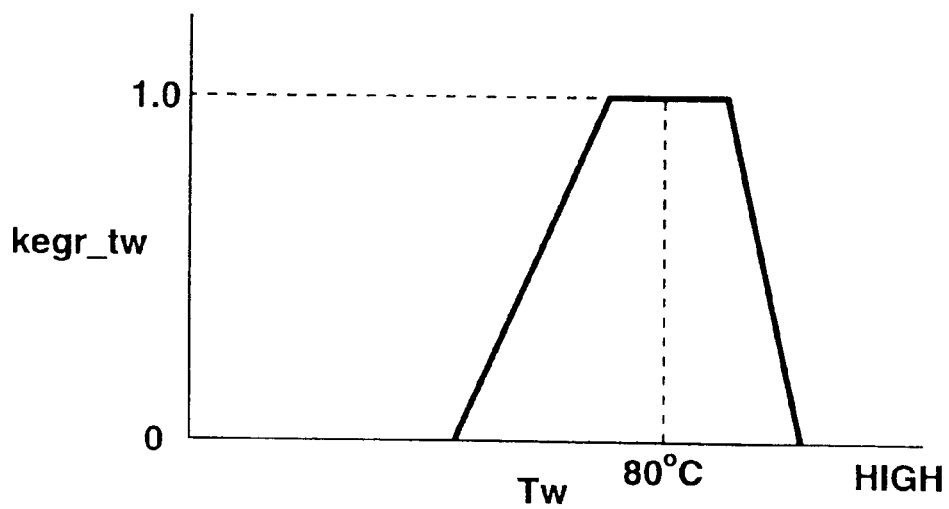
FIG. 39 is a characteristic graph representing a table of a target EGR rate correction coefficient Kegr_tw from the engine coolant temperature Tw.

At the next step ST23, the integrated controller 16 searches for a target EGR rate correction coefficient Kegr__tw from a table shown in FIG. 39 according to the engine coolant temperature Tw.

At the next step ST24, the integrated controller 16 calculates the target EGR rate Megr from the basic target EGR rate Megrb and the target EGR rate correction coefficient Kegr__tw.

At the next step ST25), the integrated controller 16 determines whether the air mixture fuel supplied to each cylinder of the engine 1 has indicated a complete explosion. The determining process of the complete explosion at the step ST25 will be described later with reference to FIG. 40.

Then, the routine goes to a step ST26. At the step ST26, the controller 16 determines if the complete explosion occurs.

If the complete explosion is determined to occur at the step ST26 (Yes), the present routine shown in FIG. 37 is ended.

If not determined to occur the complete explosion (No) at the step ST26, the routine goes to a step ST27 in which Megr=0 (zero is assigned to Megr) and the present routine is ended.

Figure 40:
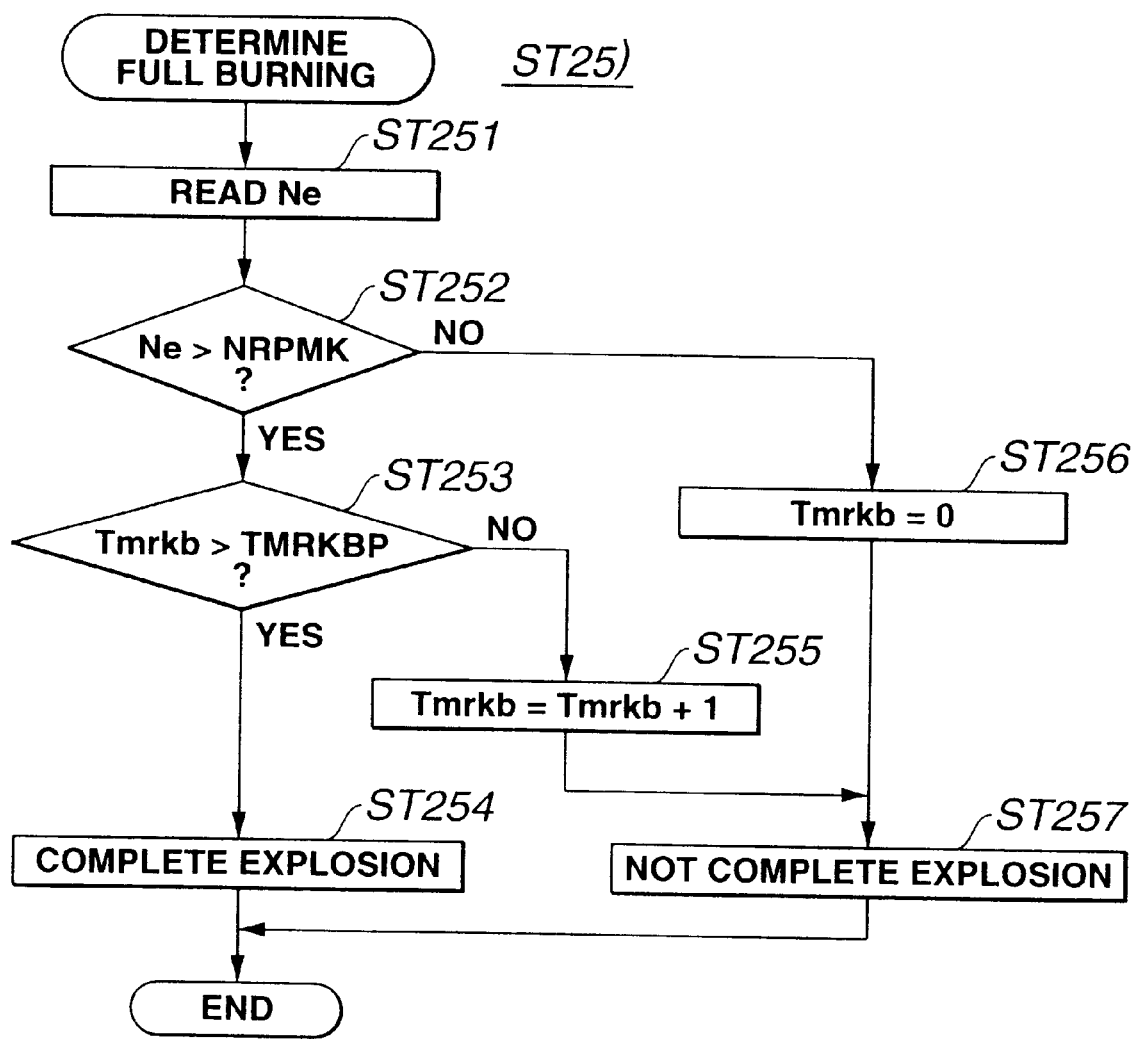
FIG. 40 is a more detailed flowchart of determining whether a complete explosion of fuel of the engine occurs in the calculation process shown in FIG. 37.

FIG. 40 shows the determination process of the engine fuel complete explosion for the step ST25) shown in FIG. 39.

At the first step ST251 in FIG. 40, the integrated controller 16 reads the engine speed Ne.

At the next step ST252, the integrated controller 16 compares the read engine speed Ne with a complete explosion slice level NRPMK to determine if the engine speed Ne is larger than the slice level NRPMK.

If Ne>NRPMK at the step ST252, the routine goes to a step ST253.

At the next step ST253, the integrated controller 16 compares a count value Tmrkb after the determination of the complete explosion with a predetermined elapsed time TMRKBP it takes due to the engine revolutions to determine whether Tmrkb>TMRKBP.

If Tmrkb>TMRKBP at the step ST253 (Yes), the routine goes to a step ST254 in which the complete explosion is determined.

If Ne≦NRPMK at the step ST252 (No), the integrated controller 16 goes to a step ST256 in which the count value TMRKBP is cleared to zero and the routine goes to a step ST257 in which the determination that the engine is not full burning state is made.

Then, the present routine is ended.

On the other hand, if Tmrkb≦TMRKBP at the step ST253 (No), the routine goes to a step ST255 in which Tmrkb=Tmrkb+1, viz., Tmrkb is incremented by one. Then, the routine goes to the step ST257 in which the determination of not complete explosion is made as described above and the routine is ended.

The above-described process shown in FIG. 40 determines that the fuel injected into the engine 2 is in the complete explosion when the engine speed Ne is equal to or above the predetermined value (for example, 400 rpm (revolutions per minutes)) and the predetermined time has passed.

FIG. 41 shows an example of the corrective control on the engine driving points described above.

Suppose now that the power generation request of 6 Kw occurs while the hybrid vehicle is driven with the vehicular driving force corresponding to 4 Kw, for example, at a point of A shown in FIG. 41. It is necessary to transfer the driving point A to any one of the other driving points at which the power of 10 Kw which is, as a total, the sum of these powers is satisfied.

According to the present invention, the engine speed and output can be controlled in such a manner that the driving is carried out at the point C shown in FIG. 41 on NOx contour lines (the equal output lines) of 10 Kw.

Thus, the NOx exhaust quantity (the quantity of NOx in the exhaust gas) can be suppressed at minimum satisfying the power generation request.

In addition, it is possible to transfer the driving point to the point B at which the rise in the engine speed is relatively suppressed and the torque is raised. In this case, the fuel consumption can furthermore be improved.

It is noted that although the integrated controller 16 performs representatively the executions on the driving force control in accordance with all of the flowcharts depicted in FIGS. 2 through 40, the individual controllers 11, 12, 13, and 14 may perform the individual control and calculation routines on the respective objects to be controlled such as the Diesel engine 1, the motor/generator 2, the transmission (CVT) 3 and the integrated controller may supply information on the accelerator opening angle (load demand) ACC and the vehicle speed (vehicular velocity) VSP to the respective controllers as described above.

It is also noted that the exhaust matter from the engine (Diesel engine 1) include a smoke, nitrogen oxide (NOx), and a particulate (soot).

The entire contents of a Japanese Patent Application No. Heisei 11-205951 (filed in Japan on Jul. 21, 1999) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A driving apparatus for a hybrid vehicle, comprising:
   an engine;
   a motor/generator having its rotary axle linked to an output axle of the engine;
   a battery electrically connected to the motor/generator; and
   a controller programmed: to calculate a target driving force [tFd], the target driving force [tFd] representing a target value of a vehicular driving force; to calculate a basic target engine speed [tNinb] on the basis of the target driving force, the basic target engine speed [tNinb] representing a basic target value of the engine speed; to calculate a power generation request quantity [tWg], the power generation request quantity [tWg] representing a power to be generated by the motor/generator; to calculate a basic target engine torque [tTeg] on the basis of the target driving force [tFd], the power generation request quantity [tWg], and the basic target engine speed [tNinb], the basic target engine torque [tTeg] representing an engine torque to be developed when an output required for a vehicular drive and for a power drive of the motor/generator is developed at the basic target engine speed [tNinb]; to calculate a limit torque [tTlim] during an occurrence of a power generation request on the basis of the basic target engine speed [tNinb], the limit torque [tTlim] during the occurrence of the power generation request representing a limit torque of the engine when the engine is driven at the basic target engine speed [tNinb], satisfying a demand for an exhaust performance of the engine; to set a target engine speed [tNin] to either the basic target engine speed [tNinb] or value different from the basic target engine speed [tNinb] according to a result of comparison between the basic target engine torque [tTeg] and the limit torque [tTlim] during the occurrence of the power generation request; and to control the engine on the basis of the target engine speed [tNin].

2. A driving apparatus for a hybrid vehicle as claimed in claim 1, wherein the controller further programmed: to set the target engine speed [tNin] to the basic target engine speed [tNinb] when the basic target engine torque [tTeg] is placed at a more exhaust performance favoring side than the limit torque [tTlim]; and to set the target engine speed [Nin] to the value based on the demand for the exhaust performance of the engine when the basic target torque [tTeg] is placed at a more exhaust performance worsening side than the limit torque [tTlim].

3. A driving apparatus for a hybrid vehicle as claimed in claim 2, wherein the controller further programmed to calculate a target engine output [tWeg] on the basis of the target driving force [tFd] and the power generation request quantity [tWg], the target engine output [tWeg] representing an engine output required for the vehicular drive and for the power drive of the motor/generator; and to set the target engine speed [tNin] to a value satisfying both of the demand on the exhaust performance of the engine and the target engine output [tWeg] when the basic target engine torque [tTeg] is placed at the more exhaust performance worsening side than the limit torque [tTlim].

4. A driving apparatus for a hybrid vehicle as claimed in claim 3, wherein the controller further programmed to calculate the limit torque [tTlim] during the occurrence of the power generation request using a control table in which a torque of the engine such that an exhaust quantity of an exhaust matter with respect to the basic target engine speed

[tNinb] becomes substantially equal to a predetermined reference quantity is stored; and to calculate the target engine speed [tNin] using another control table in which the engine speed such that the exhaust quantity of the exhaust matter with respect to the target engine output [tWeg] becomes substantially equal to the predetermined reference quantity is stored when the basic target engine torque [tTeg] is placed at the more exhaust performance worsening side than the limit torque [tTlim].

5. A driving apparatus for a hybrid vehicle as claimed in claim 4, wherein the exhaust matter is a nitride oxygen.

6. A driving apparatus for a hybrid vehicle as claimed in claim 4, wherein the exhaust matter is a particulate.

7. A driving apparatus for a hybrid vehicle as claimed in claim 4, wherein the exhaust substance is a smoke.

8. A driving apparatus for a hybrid vehicle as claimed in claim 1, wherein the controller is further programmed to calculate the limit torque [tTlim] by correcting a basic limit torque [tTlimb], calculated on the basis of the basic target engine speed [tNinb], on the basis of an EGR rate.

9. A driving apparatus for a hybrid vehicle as claimed in claim 1, wherein the controller is further programmed to calculate the power generation request quantity [tWg] on the basis of a vehicular battery charged state [SOC].

10. A driving apparatus for a hybrid vehicle as claimed in claim 1, wherein the controller is further programmed to calculate a battery request power generation [tWbat] on the basis of a vehicular battery charged state [SOC]; to calculate a catalytic converter warm-up demand power generation [tWcat] on the basis of a catalytic converter temperature [Tmpcat]; and to calculate the power generation request quantity [tWg] on the basis of the battery request power generation [tWbat] and the catalytic converter warm-up demand power generation [tWcat].

11. A driving apparatus for a hybrid vehicle as claimed in claim 10, wherein the controller is further programmed to select one of the battery request power generation [tWbat] and the catalytic converter warm-up demand power generation [Tmpcat] which is larger than the other as the power generation request quantity [tWg].

12. A driving apparatus for a hybrid vehicle as claimed in claim 10, wherein the controller is further programmed to calculate the catalytic converter warm-up demand power generation [tWcat] in such a manner that the catalytic converter warm-up demand power generation [Tmpcat] become larger as the catalytic converter temperature [Tmpcat] becomes low.

13. A driving apparatus for a hybrid vehicle, comprising:
an engine;
a motor/generator having its rotary axle linked to an output axle of the engine;
a battery electrically connected to the motor/generator; and
a controller, the controller including: target driving force calculating means for calculating a target driving force [tFd], the target driving force [tFd] representing a target value of a vehicular driving force; basic target engine speed calculating means for calculating a basic target engine speed [tNinb] on the basis of the target driving force, the basic target engine speed [tNinb] representing a basic target value of the engine speed; power generation request quantity calculating means for calculating a power generation request quantity [tWg], the power generation request quantity [tWg] representing a power to be generated by the motor/generator; basic target engine torque calculating means for calculating a basic target engine torque [tTeg] on the basis of the target driving force [tFd], the power generation request quantity [tWg], and the basic target engine speed [tNinb], the basic target engine torque [tTeg] representing an engine torque to be developed when an output required for a vehicular drive and for a power drive of the motor/generator is developed at the basic target engine speed [tNinb]; limit torque calculating means for calculating a limit torque [tTlim] during an occurrence of a power generation request on the basis of the basic target engine speed [tNinb], the limit torque [tTlim] during the occurrence of the power generation request representing a limit torque of the engine when the engine is driven at the basic target engine speed [tNinb], satisfying a demand for an exhaust performance of the engine; target engine speed setting means for setting a target engine speed [tNin] to either the basic target engine speed [tNinb] or a value different from the basic target engine speed [tNinb] according to a result of comparison between the basic target engine torque [tTeg] and the limit torque [tTlim] during the occurrence of the power generation request; and controlling means for controlling the engine on the basis of the target engine speed [tNin].

14. A driving method for a hybrid vehicle, comprising:
providing an engine;
providing a motor/generator having its rotary axle linked to an output axle of the engine,
providing a battery electrically connected to the motor/generator;
calculating a target driving force [tFd], the target driving force [tFd] representing a target value of a vehicular driving force;
calculating a basic target engine speed [tNinb] on the basis of the target driving force, the basic target engine speed [tNinb] representing a basic target value of the engine speed;
calculating a power generation request quantity [tWg], the power generation request quantity [tWg] representing a power to be generated by the motor/generator; to calculate a basic target engine torque [tTeg] on the basis of the target driving force [tFd], the power generation request quantity [tWg], and the basic target engine speed [tNinb], the basic target engine torque [tTeg] representing an engine torque to be developed when an output required for a vehicular drive and for a power drive of the motor/generator is developed at the basic target engine speed [tNinb];
calculating a limit torque [tTlim] during an occurrence of a power generation request on the basis of the basic target engine speed [tNinb], the limit torque [tTlim] during the occurrence of the power generation request representing a limit torque of the engine when the engine is driven at the basic target engine speed [tNinb], satisfying a demand for an exhaust performance of the engine;
setting a target engine speed [tNin] to either the basic target engine speed [tNinb] or a value different from the basic target engine speed [tNinb] according to a result of comparison between the basic target engine torque [tTeg] and the limit torque [tTlim] during the occurrence of the power generation request; and
controlling the engine on the basis of the target engine speed [tNin].

* * * * *